United States Patent
Capon

(10) Patent No.: US 10,776,447 B2
(45) Date of Patent: *Sep. 15, 2020

(54) DIGITAL COMMUNICATIONS PLATFORM FOR WEBPAGE OVERLAY

(71) Applicant: HVR TECHNOLOGIES INC., Toronto (CA)

(72) Inventor: Jesse Donald Capon, Toronto (CA)

(73) Assignee: HVR TECHNOLOGIES INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,968

(22) Filed: May 16, 2019

(65) Prior Publication Data

US 2019/0278815 A1 Sep. 12, 2019

Related U.S. Application Data

(63) Continuation of application No. 16/072,819, filed as application No. PCT/CA2017/000212 on Sep. 25, 2017, now Pat. No. 10,331,758.

(Continued)

(51) Int. Cl.
*G06F 40/14* (2020.01)
*G06F 16/958* (2019.01)
(Continued)

(52) U.S. Cl.
CPC .............. *G06F 16/958* (2019.01); *G06F 3/14* (2013.01); *G06F 16/00* (2019.01);
(Continued)

(58) Field of Classification Search
CPC .. G06F 16/5866; G06F 16/958; G06F 17/241; G06F 17/247; G06F 16/00;
(Continued)

(56) References Cited

U.S. PATENT DOCUMENTS

| 7,584,435 B2 * | 9/2009 | Bailey ................. G06F 9/44526 715/788 |
| 7,779,001 B2 | 8/2010 | Zeng ..................... G06F 16/951 707/726 |

(Continued)

FOREIGN PATENT DOCUMENTS

| CN | 101441644 A | 5/2009 |
| CN | 101866342 A | 10/2010 |
| CN | 105824925 A | 8/2016 |

OTHER PUBLICATIONS

Huang et al. "Scalable web-embedded volume rendering," 2017 IEEE 7th Symposium on Large Data Analysis and Visualization ( LDAV), Phoenix, AZ, 2017, pp. 45-54.*

(Continued)

*Primary Examiner* — Maikhanh Nguyen
(74) *Attorney, Agent, or Firm* — Norton Rose Fulbright Canada LLP

(57) ABSTRACT

A digital communications or content platform is provided in some embodiments that is configured to provide a useful tool for generating visualizations or other user content that is operable to create a layer or skin that acts as a pane of glass over original web content. The digital communications or content platform is configured to maintain, in a data structure, a set of data linkages representative of a set of visual components whose visual locations and website locations are dynamically maintained despite changes to the underlying webpage. The digital communications or content platform is configured to cause a display to render a hybrid webpage including both the underlying webpage and the overlay.

24 Claims, 27 Drawing Sheets

Related U.S. Application Data

(60) Provisional application No. 62/398,671, filed on Sep. 23, 2016.

(51) Int. Cl.
*G06F 3/14* (2006.01)
*G06F 16/00* (2019.01)
*G06F 16/957* (2019.01)
*G06F 40/169* (2020.01)

(52) U.S. Cl.
CPC .......... *G06F 16/9577* (2019.01); *G06F 40/14* (2020.01); *G06F 40/169* (2020.01)

(58) Field of Classification Search
CPC .... G06F 40/14; G06F 40/169; G06F 16/9577; G06F 3/14
See application file for complete search history.

(56) References Cited

U.S. PATENT DOCUMENTS

| | | | | |
|---|---|---|---|---|
| 8,196,037 | B2* | 6/2012 | Cheng | G06F 40/14 715/241 |
| 9,053,206 | B2 | 6/2015 | Cai | G06F 17/211 |
| 9,081,865 | B2 | 7/2015 | Reavis | G06Q 10/00 |
| 9,411,782 | B2 | 8/2016 | Harris | G06F 17/211 |
| 9,767,211 | B2 | 9/2017 | Cai | G06F 17/211 |
| 2006/0123340 | A1 | 6/2006 | Bailey | G06F 9/44526 715/700 |
| 2008/0298458 | A1 | 12/2008 | Yang | H03M 7/30 375/240 |
| 2009/0063500 | A1* | 3/2009 | Zhai | G06F 16/986 |
| 2009/0125529 | A1 | 5/2009 | Vydiswaran | G06F 16/951 |
| 2009/0265607 | A1 | 10/2009 | Raz et al. | |
| 2012/0059859 | A1 | 3/2012 | Jiao | G06F 16/986 707/797 |
| 2012/0072409 | A1* | 3/2012 | Perry | G06Q 30/0601 707/710 |
| 2012/0089903 | A1 | 4/2012 | Liu | G06F 16/9577 715/234 |
| 2012/0198324 | A1 | 8/2012 | Mahajan et al. | |
| 2012/0203651 | A1 | 8/2012 | Leggatt | |
| 2015/0287047 | A1 | 10/2015 | Situ | G06Q 30/0201 705/7.29 |

OTHER PUBLICATIONS

Krishnaswamy et al., "Private overlay of enterprise social data and interactions in the public web context," 9th IEEE International Conference on Collaborative Computing: Networking, Applications and Worksharing, Austin, TX, 2013, pp. 295-304.*

Canadian Intellectual Property Office (CIPO), International Search Report and Written Opinion dated Jan. 9, 2018 in respect of PCT Application No. PCT/CA2017/000212.

* cited by examiner

Code before tag or pin mode is turned on

Code after tag or pin mode has been turned on.

DIGITAL COMMUNICATIONS PLATFORM FOR WEBPAGE OVERLAY

CROSS REFERENCE

This Application is a Continuation of U.S. application Ser. No. 16/072,819 filed Jul. 25, 2018, which is a 371 US National Stage of PCT Application No. PCT/CA2017/000212 filed Sep. 25, 2017, both entitled DIGITAL COMMUNICATIONS PLATFORM FOR WEBPAGE OVERLAY, which claims priority and benefits from U.S. Provisional Application No. 62/398,671 entitled DIGITAL COMMUNICATIONS PLATFORM filed on Sep. 23, 2016, the contents of the above referenced applications are incorporated herein in their entireties.

FIELD

Some embodiments of the present disclosure generally relate to the field of online content presentation, and in more particularly, systems and methods for providing a digital communications platform that is configured for interaction with online content.

INTRODUCTION

Online content is often hosted in the form of webpages and websites. The webpages and websites host online content that is served to users that visit the webpages and websites. The content that is served to users is typically served on an individual website basis, where websites typically operate independently of other websites, and multiple users are unable to collaborate with one another. There may be rudimentary widgets available for posting comments, etc., however, such comments are often useless, irrelevant, or automatically generated by various "spam bots". For example, online news publications articles often include a widget for the public to post comments, but these widgets are often overrun with spam and simply ignored by users.

It may be desirable to have a communications platform that facilitates collaborative access or annotations relating to online content. Moreover, users may appreciate the convenience of being able to both browse a website and to annotate, comment, or share interesting content on the website at the same time without having to open multiple browsers or browser tabs.

A technical challenge with present online content is that individual websites are controlled by different entities and operate independently from one another. Accordingly, there is no cohesive framework that allows for communication across different websites, and further, operators of individual websites are not incentivized to drive traffic to other websites. However, this causes a fragmented experience for consumers of content, as a particular activity or interest area may span multiple websites that are otherwise not designed for interoperation. A technical approach and technical solution is desirable as there are many technical challenges in rendering website interoperability sufficient to provide a digital communications platform. For example, website content is often generated using a combination of static and dynamic code (source code of a webpage is rendered not only from static source code, but also dynamically generated using server/client side scripting) prone to change (e.g., what is on a landing page may be moved to a secondary page the next day), and webpages are interlinked with one another such that it is technically challenging to identify the actual source of content being hosted on a particular website (e.g., hyperlinks or frames embedding content from other sources).

It is further important that memory and computing resource efficient approaches are taken such that the overall processing time and memory usage is minimized. There can be severely deleterious impacts on user experience if a webpage loading time is increased beyond a particular threshold (e.g., a loading time that requires an additional 300 ms may, in some cases, be untenable).

In some embodiments, it may be desirable to integrate with any type of website, regardless of whether that website has any software development kit (SDK) or application programming interface (API) capabilities built into it. For example, Pinterest-™ interoperability is established by way of requiring compatible websites to install or add various code elements such that users are able to append "pins" and other annotations onto pictures, etc. (e.g., users need to add Javascript code for Pinterest Tags, add on the Pinterest API), among others.

The Pinterest API, for example, requires the website to include specific authentication provisions, integrate with Pinterest's ad-tracking/metric software, conduct login/track session information, among others, and accordingly, there are many websites that are not configured to integration with Pinterest due at least to the technical requirements and complexity, among other reasons. Similarly, Facebook has a social plugin that provides for some additional functionality for a website based on the Facebook digital platform, (e.g., adding like buttons, quotes, sharing, sending), but similarly, prior integration by a website developer is required (e.g., by way of the website owner integrating by way of a Facebook SDK), and the social plugin cannot be used on non-integrated websites.

It may be desirable to have a digital content layer that is renderable free of a requirement for compatible websites to include such SDKs or APIs, especially as (1) not all websites are designed for interoperability with SDKs and APIs (the requirement to do so effectively segregates the scope of interoperable webpages between those that are encoded for interoperation, and those that are not; which is problematic where a seamless experience is desired), and (2) users may wish to be able to interact with websites without being tracked by platform specific SDKs and APIs. The digital content layer needs to incorporate "look and feel" elements from the host website, however and provide opportunities for interaction without having the user content interacting with the underlying host website. A hybrid web page is thus presented by way of the digital content layer, merging host website content and digital content layer information.

However, to do so free of requiring websites to include SDKs or APIs, the implementation of a digital communications platform becomes more technically challenging. Additional technical steps are required to effectively transform the website in preparation for use with a digital content layer (e.g., without such SDKs or APIs, it becomes more technically challenging to ensure that annotations, visual elements, etc., maintain proper positioning and persistence as webpages change over time or due to dynamically generated code).

SUMMARY

A digital communications or content platform is provided in some embodiments that is configured to provide a useful tool for generating visualizations or other user content (e.g., user initiated, user generated) that is operable to create a "layer or skin" that acts as a "single pane of glass" over original web content (e.g., hosted on the Internet). This tool is implemented using computer technology, including processors, networking interfaces, computer-readable memory, computer-readable instruction sets, data storage, among others.

The processors, networking interfaces, computer-readable memory, computer-readable instruction sets, data storage interoperate with one another to provide non-conventional and non-generic implementations whereby, as described in various embodiments, transformations of underlying website information is required to provide the digital communications or content platform. The processors, networking interfaces, computer-readable memory, computer-readable instruction sets, data storage interoperate with one another to provide, among others, presentation layer persistence engine, web source code parsing/transformation engines, visual component generators, crawler update components, among others, that help render hybrid webpages that include both host content and visualizations (e.g., some rendered based on positioned anchors and coordinates whose locations are dynamically maintained in a data storage), co-displaying the information with the "look and feel" of the first website with the desired content stored within the digital communications or content platform.

The tool is not limited only to website content, but in some embodiments, is directed to augmented reality or other mapping information where visualizations may be overlaid host content and a hybrid rendering is possible. The tool only operates in relation to electronic information, and has no non-electronic analog.

The tool generates or controls the rendering of visualizations on one or more user computing devices, which, for example, may be web browsers operating on tablet computers, desktop computers, smartphones, etc. The tool, in some embodiments, is provided in the form of a cloud-based service whereby web browsers can be configured for interoperation (e.g., by way of an extension), or web browsers may route through a specially configured portal or link. In an alternate embodiment, the tool is configured for and optimized for specialized usage in a corporate environment, where a special purpose device is provided for placement into a data center as a physical hardware appliance adapted for providing platform functionality across a limited set of users connected to the data center.

These visualizations are adapted such that different users can effectively "surf the internet" together in a cohesive manner whereby user content and other types of visual annotations can be placed in relation to various types of online content (e.g., text, embedded videos, photos). A platform is provided that is cross-website, and usable by many users together (e.g., such that a conversation can be formed through annotations and comments), or by a single user seeking to generate annotations for the user's own use (e.g., conducting a research project). In some embodiments, the platform operates without underlying website or web content being specially configured for use with the platform, and the platform is configured to transform the underlying website or web content for use with the platform.

This is not an approach that is the routine or conventional use of the Internet, additional challenges must be overcome. Technical challenges arise as a result of internet and online content technologies, and specialized computer technology and approaches are described in various embodiments to overcome technical problems that arise specifically in the realm of computer networks, and hosted internet content. Web content is typically unstable and has a combination of dynamic and static elements. In some cases, web content source code is generated dynamically through the use of server side of client side scripting. In other cases, web content is further interconnected such that what is rendered for a particular website is not actually hosted on that website, and rather, a computer-generated linkage is established to "pull" information from the underlying data source.

To address these problems, various approaches are provided in embodiments described herein, and a tool is described that conducts and serves to a user a new, hybrid rendered page that includes the visualizations that merges content associated with "layer or skin" that includes visualizations, user content, and/or other visual interface elements that are thematically relevant and positioned overtop the original content such that increased technical functionality is available to the user, without disrupting the "look and feel" of the host website, and provides users with the opportunity to generate annotations or comments without actually placing them into the actual website.

In particular, technical problems arise in relation to ensuring that the visualizations persist despite changes to the websites and are rendered properly from a visual location perspective when the user's computing device renders the hybrid webpage view. Web content changes frequently and in some embodiments, computer-implemented methods and data transformation are required to establish a stabilized version of the webpage for processing prior to establishment of the visual anchors, and ultimately the rendering of the visualizations. The visual anchors, content, and rendering instructions, in some embodiments, are stored in the form of one or more encapsulated control command instructions that are then transmitted to a browser or other rendering application that causes the generation of the hybrid display on the user's device.

A data storage is configured to track and maintain the relationships such that the data storage can be traversed when rendering the visualizations. In some embodiments, a crawler mechanism is used to periodically or continuously update the relationships stored in the data storage. User tag information, in the data storage, is enhanced with additional linkage information in some embodiments based on crawled or processed web content information, the additional linkage information indicating, for example, a position within an object model for a webpage that the source code is likely to be found for the content, whether the content is hyperlinked to a parent site that actually hosts the content, representative features of the content itself (e.g., the website may have changed), candidate coordinate values for a visualization such that the visualization is visually proximate (e.g., on the upper left hand corner) of the content, etc.

In an aspect, there is provided a computer-network-implemented method for providing a presentation layer configured to persist over a webpage and to present a set of visual components based on content of the webpage, the presentation layer operable to be displayed as a graphical overlay rendered over the webpage on a display screen of an electronic device such that a hybrid webpage is displayed, the method comprising: receiving, by a computer processor, computer instruction code representing a webpage comprising one or more content elements, the computer instruction code, when executed, causes the computer processor to render the webpage and the one or more content elements; receiving, by the computer processor, one or more electronic signals from the electronic device representing a user request for tagging a selected content element of the one or more content elements on the webpage, the user request comprising user content relating to the content element;

obtaining, by the computer processor, a source information of the content element from a Document Object Model (DOM) associated with the webpage; determining, by the computer processor, one or more candidate locations of the content element within the computer instruction code based at least on an analysis of the source information of the selected content element; analyzing, by the computer processor, one or more nodes of the DOM proximate or associated with each of the one or more candidate locations within a DOM hierarchy of the one or more nodes of the DOM to determine a stable tag location of the selected content element from the one or more candidate locations, the stable tag location representing a location within the computer instruction code of the webpage where additional computer instruction code can be appended such that a visual tag is graphically anchored on or visually proximate to the selected content element when the webpage is rendered; generating and storing a first tag information based at least on the stable tag location of the selected content element; and generating first control signals adapted to control of the display screen on the electronic device, the first control signals, when executed, causing rendering of a first visual anchor point of the selected content element based on the first tag information, wherein the first visual anchor point is configured to be presented as an overlay on top of the selected content element on the webpage when displayed.

In another aspect, the method includes obtaining, by the computer processor, a corresponding type of each of the one or more content elements from the DOM associated with the webpage; determining, by the computer processor, whether each of the one or more content elements is tag-able based on the corresponding type thereof; generating and storing a list of DOM node location identifiers corresponding to all tag-able content elements in a non-transitory database.

In another aspect, the method includes receiving, by the computer processor, one or more electronic signals from the electronic device representing a user input event relating to a tag-able content element of the one or more content elements; in response to the user input event, generating, for display on the electronic device, a visual layer, wherein the visual layer is configured to be presented as an overlay on top of the tag-able content element on the webpage when displayed; and generating second control signals adapted to control of the display screen on the electronic device, the second control signals, when executed, causing rendering of the user-generated content relating to the selected content element, wherein the user-initiated content is configured to be presented as an overlay on top of the webpage when displayed.

In another aspect, the source information of the selected content element comprises a Uniform Resource Locator (URL) and the stable tag location comprises a stable portion of the URL, wherein the stable portion of the URL is obtained by parsing the URL to remove non-relevant portions of the URL.

In another aspect, the analyzing of the DOM to determine the stable tag location of the selected content element from the one or more candidate locations includes: for each candidate location of the one or more candidate locations, identifying a DOM node associated with the candidate location; traversing the DOM hierarchy to analyze proximate nodes within a pre-defined depth of analysis centered based on the DOM node associated with the candidate location; retrieving one or more objects from the proximate nodes; and heuristically analyzing the retrieved one or more objects from the DOM to identify the stable tag location of the one or more candidate locations.

In another aspect, the tag information comprises the stable tag location and the one or more objects proximate in the DOM hierarchy.

In another aspect, the user input event comprises an event where a cursor hovers the tag-able content element.

In another aspect, the method includes generating and storing a second tag information based on the one or more candidate locations of the selected content element; and generating, for display on the electronic device, a second visual anchor point of the selected content element based on the second tag information, wherein the second visual anchor point is configured to be presented as an overlay rendered over the selected content element when the selected content element is displayed.

In another aspect, the placement of the second visual anchor point is based at least in part on the user request.

In another aspect, the method includes generating and presenting a graphical user interface (GUI) component as an overlay rendered over of the webpage, the GUI component comprising a plurality of user content, wherein one or more of the plurality of user-initiated content is related to the visual anchor point.

In another aspect, a system is provided that generates and/or maintains a presentation layer configured to persist over a webpage and present a set of visual components based on content of the webpage, the presentation layer operable to be displayed on top of the webpage on a display screen of an electronic device, the system comprising: an I/O interface; a non-transitory memory device; and a computer processor, when executing programmable instructions stored on the non-transitory memory device, is configured to perform the following: receive, via the I/O interface, a computer instruction code representing a webpage comprising one or more content elements, the computer instruction code, when executed, causes the computer processor to render the webpage and the one or more content elements; receive, via the I/O interface, one or more electronic signals from the electronic device representing a user request for tagging a selected content element of the one or more content elements on the webpage, the user request comprising user-content relating to the content element; obtain a source information of the content element from a Document Object Model (DOM) associated with the webpage; determine one or more candidate locations of the content element within the computer instruction code based at least on an analysis of the source information of the selected content element; analyze one or more nodes of the DOM proximate or associated with each of the one or more candidate locations within a DOM hierarchy of the one or more nodes of the DOM to determine a stable tag location of the selected content element from the one or more candidate locations, the stable tag location representing a location within the computer instruction code of the webpage where additional computer instruction code can be appended such that a visual tag is graphically anchored on or visually proximate to the content element when the webpage is rendered; generate and store a first tag information based at least on the stable tag location of the selected content element; and generate, for display on the electronic device, a first visual anchor point of the content element based on the first tag information, wherein the first visual anchor point is configured to be presented as an overlay on top of the content element on the webpage when displayed.

In another aspect, the computer processor is further configured to: obtain a corresponding type of each of the one or more content elements from the DOM associated with the webpage; determine whether each of the one or more content elements is tag-able based on the corresponding type thereof; generate and store a list of DOM node location identifiers corresponding to all tag-able content elements in the non-transitory memory device.

In another aspect, the computer processor is further configured to: receive one or more electronic signals from the electronic device representing a user input event relating to a tag-able content element of the one or more content elements; in response to the user input event, generate, for display on the electronic device, a visual layer, wherein the visual layer is configured to be presented as an overlay on top of the tag-able content element on the webpage when displayed; and generate, for display on the electronic device, the user-initiated content relating to the content element, wherein the user-initiated content is configured to be presented as an overlay on top of the webpage when displayed.

In another aspect, the source information of the selected content element comprises a Uniform Resource Locator (URL) and the stable tag location comprises a stable portion of the URL, wherein the stable portion of the URL is obtained by parsing the URL to remove non-relevant portions of the URL.

In another aspect, analyzing the DOM to determine the stable tag location of the selected content element from the one or more candidate locations includes: for each candidate location of the one or more candidate locations, identifying a DOM node associated with the candidate location; traversing the DOM hierarchy to analyze proximate nodes within a pre-defined depth of analysis centered based on the DOM node associated with the candidate location; retrieving one or more objects from the proximate nodes; and heuristically analyzing the retrieved one or more objects from the DOM to identify the stable tag location of the one or more candidate locations.

In another aspect, the tag information comprises the stable tag location and the one or more objects proximate in the DOM hierarchy.

In another aspect, the user input event comprises an event where a cursor hovers the tag-able content element.

In another aspect, the computer processor is further configured to: generate and store a second tag information based on the one or more candidate locations of the selected content element; and generate, for display on the electronic device, a second visual anchor point of the selected content element based on the second tag information, wherein the second visual anchor point is configured to be presented as an overlay rendered over the content element when displayed.

In another aspect, the placement of the second visual anchor point is based at least in part on the user request.

In another aspect, the computer processor is further configured to generate and present a graphical user interface (GUI) component as an overlay rendered over the webpage, the GUI component comprising a plurality of user content, wherein one or more of the plurality of user-initiated content is related to the visual anchor point.

In another aspect, a special purpose computing apparatus is provided that supports a presentation layer configured to persist in relation to one or more webpages, the special purpose computing apparatus including one or more graphics processors and computer-readable memory, the special purpose computing apparatus configured for interoperation with one or more networked computing devices configured to render one or more webpages and to modify the rendering of the one or more webpages to overlay the presentation layer, the special purpose computing apparatus comprising: a presentation layer persistence engine configured to maintain a data structure including data records representative of characteristics of a set of visual components adapted for rendering on a presentation layer persisting in proximity to or over top of the one or more webpages, wherein each visual component of the set of visual components includes a locator field representative of a corresponding anchor position defining a relative location on a corresponding webpage that the visual component is rendered when the corresponding webpage is rendered by the one or more networked computing devices; a webpage source code parsing engine configured to intercept source code for the rendering of the one or more webpages, the webpage source code parsing engine configured to parse the intercepted source code to identify one or more candidate anchor locations within the one or more webpages where the visual components of the set of visual components can be anchored, each of the one or more candidate anchor locations being associated with a content object rendered on the one or more webpages; an interface receiver configured to receive selected inputs from one or more users operating the one or more networked computing devices indicative of a new tag to be associated with a selected candidate anchor location of the one or more candidate anchor locations; a visual component generator configured to, responsive to each selected input of the selected inputs from the one or more users, generate, in association with the new tag, a new visual component to be appended to the data structure and to be maintained by the presentation layer persistence engine at the selected candidate anchor location, the visual component generator configured to parse the source code to determine whether the content object underlying the selected anchor location is hosted directly on the webpage, or hyperlinked to a web location hosted on an underlying content server; the presentation layer persistence engine further configured to update the data structure to include, for the new tag, data records for a new visual component indicative of a relative position on the visual component, and upon a determination that the content object underlying the selected anchor location is hyperlinked to the web location hosted on the underlying content server, generating an additional linkage linking the new visual component to the web location hosted on the underlying content server; and a presentation layer rendering engine configured to append new source code into the intercepted source code for a webpage being traversed by a user of the one or more users on a corresponding networked computing device, the new source code representative of visual components associated with content objects in the webpage being traversed; the new source code causing the networked computing devices, when rendering the one or more webpages, to display the visual components associated with content objects in the webpage being traversed at the corresponding anchor positions within the rendered webpage in a hybrid webpage.

In another aspect, the presentation layer persistence engine is further configured to systematically traverse the one or more webpages to identify changes in a layout or a hierarchy of the one or more webpages, and responsive to the identified changes, update the data structure to adapt the to the identified changes by modifying coordinate positions of the one or more anchor locations corresponding to each visual component maintained in the data structure.

In another aspect, the presentation layer persistence engine is further configured to identify archiving changes on webpages, and is configured to periodically crawl associate webpages as defined by traversing DOM nodes to identify potential areas that the archived change has occurred, and updating the data structure to reflect the changed reference and structure.

In another aspect, the data records are representative of characteristics of a set of visual components adapted for rendering on a presentation layer persisting in proximity to or over top of the one or more webpages, wherein each visual component of the set of visual components includes a locator field representative of a corresponding anchor position defining a relative location on a corresponding webpage that the visual component is rendered when the corresponding webpage is rendered by the one or more networked computing devices.

In another aspect, the webpage source code parsing engine is further configured to generate a stabilized version of the intercepted source code by separating static markup language sections of the webpage source code from dynamic sections of the webpage source code, transforming the dynamic sections of the webpage source code into static markup language by recording a point-in-time source code snapshot of the dynamic sections of the webpage source code; wherein the one or more candidate anchor locations are identified by the visual component generator based on the stabilized version of the intercepted source code.

In another aspect, the special computing apparatus is a standalone computing appliance that is configured for networked interconnections with the one or more one or more networked computing devices configured to the render one or more webpages.

In another aspect, the standalone computing appliance is a rack-mounted device adapted for use in relation to an organization, wherein the one or more one or more networked computing devices are all organization-issued devices and the presentation layer persistence engine is configured to propagate user content by way of the visual components rendered on browsers rendering web content associated with each of one or more one or more networked computing devices, the visual components facilitating virtual collaboration among the users of the organization.

Embodiments are described by way of example, and there may be more, alternate, different, less steps in a process or a component configured to implement the present embodiments. Steps and structure may be presented in various combinations, and different combinations of the above are contemplated.

Computer implementation is essential, and in some embodiments, the tool is a specialized physical hardware unit configured for interoperation with computing components housed within a physical data center that provides command and control signals for modifying display rendering characteristics in generating hybrid webpages whereby host webpages are overlaid with a visualization layer that includes visual components that are dynamically maintained such that their display positioning remains proximate the associated host content, and the underlying linkages are maintained such that the visual components undertake computation steps to attempt to "follow" the host content as the webpage changes over time (e.g., as the host content becomes archived, moved further up/down a page, put into a frame). The embodiments may also be provided in the form of a computer software product that is stored on computer-readable memories or media as a series of computer-implemented steps, which when executed on a processor, cause the processor to perform steps of methods described herein.

To reduce computational requirements and processing time, in some embodiments, heuristic or processor limited approaches are utilized to reduce an overall search space for detecting page changes and modifications thereof, improving processing time while incurring a cost in relation to effectiveness of maintaining dynamic links (e.g., due to reductions in processing, some dynamic links may not be properly updated as a result of heuristic or reduced processing approaches). A physical appliance rack server is contemplated in some embodiments having specialized graphics processors and dedicated memory to improve computational performance, the physical appliance rack server being designed for interoperation with a data center by way of a message bus or other communications infrastructure.

BRIEF DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 10-19, 20A, and 20B are annotated screenshots illustrating platform code for presentment of various visual anchor points and elements, according to some embodiments.

DETAILED DESCRIPTION

Figure 1:
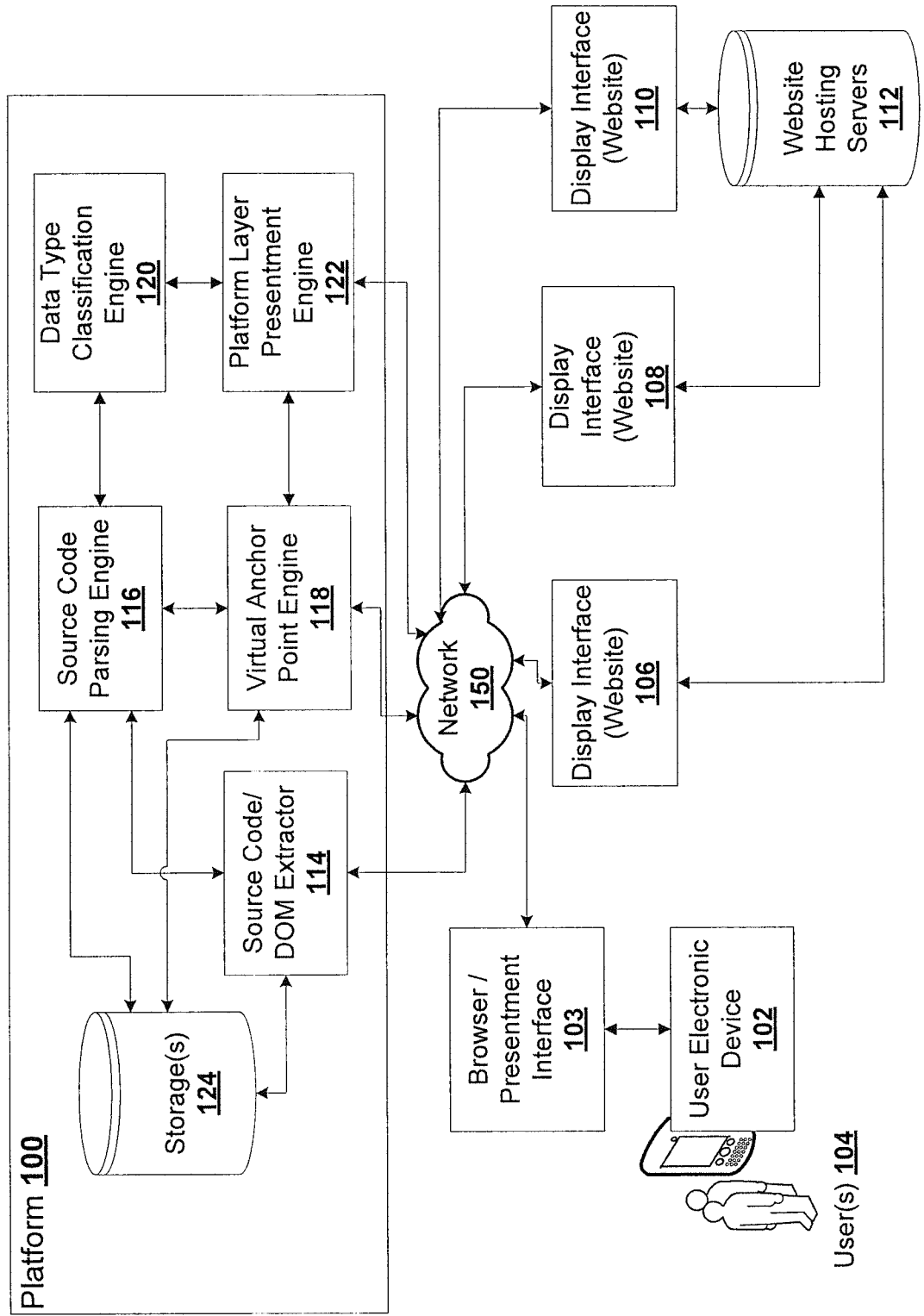
FIG. 1 is a block schematic diagram of an example platform according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

A challenge with existing websites and web content is that information is presented to users in a disparate manner, wherein users are unable to, unless site-by-site functionality is provided, collaborate or share content or comments with other users. While there may be functionality such as forums, online comment sections, etc., these tools are often controlled by the owner or host of the website content, and are subject to censorship, control, from these parties or their affiliates. Traditional social or communication platforms or networks such as Facebook™, email, iMessage™, Blackberry Messenger™ and Twitter™ require that users/websites participate in a specific, proprietary portal or interface (e.g., requiring the use of an SDK or API). The process to share third party information on these platforms is generally through copying and pasting from a source to the portal or interface (e.g., a Facebook™ feed), and the process may be inefficient and error prone, especially where a larger number of users wish to collaborate with one another. Furthermore, information and content discovery is usually limited by the information presented to the user, as controlled by the communication platform.

There are some third party solutions that attempt to provide collaboration and/or sharing abilities for website navigation, such as the Pinterest™ browser button, or Evernote™ platform integration. The Pinterest™ platform provides a button in which people are able to "pin" specific images that they come across in various webpages, but these solutions tend to require API integration with the webpages hosting the solution, which is used, among others, to track interactions and integration with the platform.

Traditional collaboration tools and media tend to aggregate and present user-generated content (e.g. pictures, videos, chat or comments) at a specific website or portal, requiring a user to navigate away from source content to share or post his or her own comments relating to the source content. For example, a user may be browsing a New York Times article online, and then would have to open a new browser or a new tab to login to his or her Facebook™ account in order to share the article. These traditional platforms are often limited by way of requiring active integration from content providers. That is, in order to leverage tools provided by these platforms, a content provider (e.g. www.cnn.com) may need to expose the website to API functionality to the platform or has to utilize a software development kit (SDK) in creating platform-specific content or widgets that can be interacted with. Such a solution may have potential deficiencies from a scalability perspective, as significant time and effort may be required to customize or modify each website for interoperability.

Dynamic tagging is particularly difficult to implement from a technical perspective. During Applicants' research and development process, alternative and different approaches were considered, and some embodiments described herein provided an innovative approach that elegantly solved many of the technical problems. For example, an alternate approach that was considered was to use visual bookmarking by way of a screen capture tool that enabled a user could copy the screen and draw on it or type on the image and then share this bundle through a chat or communication system built right into the browser. This approach was considered to be untenable as the dynamic nature of webpages caused the screen captures to quickly become out of date and out of alignment with the state of the webpage as it was being presented.

With reference to FIG. 1, embodiments are provided wherein a platform 100 is provided such that individuals, groups and subgroups can initiate, receive, and display user-generated and third-party information or content above any website or location online, without having to navigate away from the website or opening a new tab. The platform provides functionality that supports user commands and inputs that are directed to sorting the information to their satisfaction and organize the information in various ways. The platform may be content and website independent and configured for interoperability.

The platform may be adapted to address technical challenges relating to the instability of web presentment components and content, such as content provided using JavaScript, PHP, dynamic HTML elements, pins and tags, Flash™, Silverlight™, AJAX, among other technologies. Visual anchor points (e.g., pins) may be generated based on a parsed and transformed underlying stable URL and/or extraction of online content, and information is associated and accessible through association with the one or more visual anchor points. The visual anchor points are maintained and generated to ensure visual proximity to the online content when ultimately a hybrid view is rendered, the visual anchor points providing anchor locations for user content or visualizations (e.g., a bubble) overlaid on top of the original hosted online content.

A user may configure, customize, and add or delete data to the various visual anchor points. The visual anchor points and its associated user-generated content can be shared and collaborated by activities of one or more other users who may be accessing the same page at the same or different time. The visual anchor points may be generated by the platform through code injection/insertion by, for example, a browser extension during presentment of the webpage on a user's computing device. In some embodiments, code is injected or inserted during the rendering of the webpage.

In other embodiments, the original content fully loads, and a visual layer is overlaid overtop of the original content, the visual layer including, for example, a set of visualization elements that are rendered and positioned in accordance with a grid over top of the original content. The grid may provide a reference coordinate system that is utilized to establish where the visual elements should be placed such that the visual elements are visually proximate to the original content (e.g., in the upper left corner). The reference coordinate system, for example, may include information in one or more dimensions, such as in a first dimension (a "latitude" coordinate value that indicates where, along an x axis, the visual element should be rendered) and in a second dimension (a "longitude" coordinate value that indicates where, along a y axis, the visual element should be rendered). In some embodiments, a third coordinate is possible, for example, a coordinate indicating distance or height (in the context of augmented reality or virtual reality implementations). Other coordinate systems are possible (e.g., radial coordinates, polar coordinates, cylindrical coordinates, spherical coordinates).

The data provided to the platform may also be utilized to generate various analytics and decision support systems, for example, a user can create a compilation and personalization of their activities on the platform and on underlying webpages, and the user can organize and sort information by interest, type, group, topic, date and time, world events, popularity, association to other users, etc. This information may be utilized to automatically generate predictions, identify interests, and etc.

In an example system depicted in FIG. 1, a system or platform 100 is provided that is operable to create a "layer or skin" that acts as a "single pane of glass" over original web content (e.g., hosted on the Internet). Platform 100 may provide an underlying data structure, for instance, a matrix or chart which saves user selected visual anchor points and the associated information (e.g. group comments) related to these visual anchor points, and present the associated information as an overlay on top of the web content. The layer is a digital communications layer that is adapted for cooperation with an underlying display interface (e.g., the website).

In some embodiments, platform 100 may build and present, via Platform Layer Presentment Engine 122, an information overlay to any website that is more intuitive, complimentary, useful, and efficient than storing communication away from where its related content is found. Platform 100 may be configured to overcome technical challenges with stabilizing or "rewiring" the dynamic nature of web content. Websites by design can be changed often by website administrators or users. For a platform to pin or tag a content element (e.g. an article or an image) while not embedding in a site or network, several steps may be undertaken. In some embodiments, platform 100 may narrow down the tag-able (or taggable) elements to network or HTML elements which may be part of the "user story" such as an image a link or a paragraph. In some embodiments, platform 100 may, via Source Code/DOM Extractor 114, retrieve source information from a Document Object Model (DOM) tree (e.g., an object model tree having interconnected nodes that, together, represent content and other display information associated with a document, such as a webpage, or other document), and proceed to pin or tag anything, such as a block of white space or a border line to a site. In some embodiments, platform 100 may first examine if the content element is in a list of pre-determined taggable elements based on its data type.

Platform Layer Presentment Engine 122 is configured to persist the presentation layer by maintaining a data structure within storage 124, which includes data records representative of characteristics of a set of visual components adapted for rendering on a presentation layer persisting in proximity to or over top of the one or more webpages. The visual component records includes, for example, a locator field representative of a corresponding anchor position defining a relative location on a corresponding webpage that the visual component is rendered when the corresponding webpage is rendered by on a display of a computing device.

Data Type Classification Engine 120 may be configured to determine a data type of a content element and to compare the data type as determined against a list of pre-determined taggable elements. For example, the list may include: images, text, paragraphs, headlines and headings, links, videos, and animated images such as gifs. Platform 100 may then identify where and how the content element is hosted. For example, platform 100 may determine if the content element is hosted or native to the website. In the case of an image, platform 100 may reference one or more image databases. The image database may be stored locally on platform 100 (e.g., at storage 124) or elsewhere. For example, an image database may be Azure Cosmos DB or Document DB. For another example, platform 100 may be configured to reference a plurality of third party database to determine where a content element may be hosted or originally uploaded. Use of third party image databases may help keep the front end of platform 100 as light and accurate as possible.

In some embodiments, platform 100 may be configured to retrieve source information from a network menu or a data set that defines said network. In some embodiments, the source information may include position data such as coordinates representing a longitude and/or a latitude. Platform 100 may be configured to provide a visual feature set of electronic presentment tools that interoperate with components of the underlying electronic display interface. The Data Type Classification Engine 120 of some embodiments is configured for parsing webpage by intercepting source code for the rendering of the one or more webpages to identify candidate anchor locations where the visual components can be anchored and associated with a content object rendered on the webpages.

Platform 100 is configured to inspect, extract, and/or parse underlying source code associated with the web content, and operates in a way such that the underlying website hosting the web content is not aware that the program is running. Platform 100, for example, may provide a third party network that is utilized as an opt-in tool a user activates to sort and store and communicate how they want. Platform 100 may provide a set of waypoints or visual anchor points that are stored on a storage device of platform 100 such that the visual anchor points are designed to have information payloads associated with them. The information payloads may, for example, provide areas, such as fields (e.g., string fields, images, videos) where a user may be able to comment, annotate, and/or otherwise interact with the layer on top of the website.

In some embodiments, platform 100 may be provided in the form of a browser plugin that when run, may provide a browser extension, that is persistent as the user traverses different websites of the Internet. The browser extension may manifest itself as a bar (or other visual or interactive interface device) that may provide widgets upon which users are able to interact with the platform to, for example, place annotations or comments in relation to specific visual features of the web content, without the knowledge of the web server hosting the web content. Platform 100 may include various units, which may be configured in the form of software, hardware, embedded firmware, or a combination. The units may have stored upon them non-transitory machine readable instructions, which when executed by a processor, may direct the processor to execute and perform various functions.

The user computing device 102, through browser/presentment interface 103 may be configured to request website and/or web content from websites 106, 108, and 110, whose information may be hosted, for example, by website hosting servers 112. The information is transferred through a network 150, and platform 100 may provide a middle layer of operability wherein the content of the webpages, including associated metadata and embedded content, is analyzed and extracted using a source code extractor 114. An interface receiver is provided to receive selected inputs indicative of a new tag to be associated with a selected candidate anchor location.

The source code extractor 114 may be configured to obtain, in real or near real-time, the electronic instructions that are processed by a presentment interface (e.g., a web browser) to display the content of the website. For example, source code extractor 114 may be configured to extract one or more data items from a DOM associated with a web page from websites 106, 108 and 110. Throughout this disclosure, it is understood that the term "source code" may include text from a DOM or HTML associated with a webpage. Source code may also include text from any document that describes a network in a schematic manner. For example, source code may be a DOM described in HTML or CSS language.

A source code parsing engine 116 may receive the extracted source code from source code extractor 114, and parse the extracted source code such that data types can be classified for processing (e.g., stable/unstable, dynamic/static) by the data type classification engine 120. A virtual anchor point engine 118 may be utilized to identify, classify, and generate visual layers and visual anchor points that are utilized for association with one or more information payloads (e.g., annotations, comments, images) and any associated metadata (e.g., hashtags, executable code). The virtual anchor points and their associated information may be stored, for example, in non-transitory computer storage 124 (e.g., a database, flat files). In some embodiments, a matrix data structure is stored therein in storage 124 which maintains a list of potential virtual anchor points regarding each website or webpage of interest, and defined linkages to their associated information payloads and/or metadata.

In some embodiments, information regarding visual anchor points may be stored in a database external to platform 100. For example, it may be stored in a cloud server system.

When a user navigates his/her browser or other type of presentment interface to a particular webpage or website, platform may invoke the platform layer presentment engine 122 to cause the presentment of the platform layer over the underlying website through the browser/presentment interface 103 to a user 104's computing device 102. The platform layer presentment engine 122 is configured to obtain, from the virtual anchor point engine 118 and storage 124, the associated virtual anchor points to be displayed on the website, and limitations and logical rules around interactions thereon with them.

In some embodiments, virtual anchor point engine 118 is configured to periodically monitor (e.g., poll) a list of websites or webpages where content is hosted such that the virtual anchor point engine 118 can determine whether such virtual anchor points are still supported by content elements or if the virtual anchor points are no longer supported. Where the virtual anchor points are no longer supported, the virtual anchor point engine 118 may be configured to modify the virtual anchor points to other visual components of the website or webpage, or attach it generally to the website without a specific visual component being modified. The data structure stored on storage 124 can be periodically updated (e.g., by use of a crawler) to ensure data records for a new visual component are up to date, and in some embodiments, additional information is stored in an additional field indicating alternative potential locations for the data content. For example, where the content is identified to be hyperlinked to an alternate web location hosted on an underlying content server, an additional linkage may be generated adapted for linking the new visual component to the web location hosted on the underlying content server.

In some embodiments, instead of periodically monitoring or polling a list of websites or webpages, virtual anchor point engine 118 may be configured to examine only the visual anchor points associated with one or more content elements on the webpage that a user is visiting. In some cases, only the visual anchor points associated with content elements that are in view to the user are examined. If engine 118 has determined, based on its examination, that one or more visual anchor points are no longer supported, for example, some of the content elements associated with the original visual anchor points may no longer exist on the webpage the user is visiting, then engine 118 may search for and locate a second tag location for the same content element and proceed to automatically generate a new anchor point based on the second tag location. In some embodiments, virtual anchor point engine 118 is configured to identify and traverse similar pages that are hosted by the same domain to identify new anchor point locations. For example, a photo may have been moved to an archived page that is accessible on the same domain, and in some embodiments, virtual anchor point engine 118 crawls the webpage periodically to update anchor points to the archived page, maintaining the integrity of the visualization locations despite relocations of the underlying content to different webpages hosted within a same domain.

Platform 100, through configured virtual anchor points and their associated information acting in concert provides a content management system that, among other functionality, enables sorting and display of information that is recalled and sorted in the form of a visual and/or interactive layer that is operable on "top" of a webpage or website. The platform layer presentment engine 122 may be configured to compile content or communication threads, support searching and compile functions, among others. In some embodiments, a user or administrator may also utilize the platform layer presentment engine 122 to obtain population-level analytics, including, for example, generating marketing and/or advertising predictions based on user attributes, determined or estimated user interests (e.g., based on comments, sharing, annotations or other activity of the user).

For example, platform 100 may be configured to extract and/or estimate a user's itinerary by searching and surveying a conversation thread where a user has created a group to book a vacation and has added people to this group, who all start searching the internet and adding tagged content to the platform. Over time, a number of anchor points are modified and associated with information, the users may utilize platform 100 by way of the presentment engine 122 to generate a time based result from their search queries; to organize a useful timetable to visit and stay at all the locations the user has researched. In some embodiments, platform 100 may be configured to store user research or content in a number of ways at the user's request. A user's tags, searching history, and comments can be public, private, or invite only. For example, a user can tag and/or comment on different content across various websites, and request platform 100 to output a GUI (or a document) including all the content and comments based on one or more tags across different websites. The user may also be able to access other users' research, tags, and comments, if other users have set their content to be public or to be shared with said user.

For websites in the absence of such a platform 100, a user would have to cobble together all these disparate search elements and create an output. Platform 100, in some embodiments, utilizes machine learning tools available to further form aggregations and predictions based on stored information.

The platform layer presentment engine 122 is configured to provide an interface that enables users to organize the visual anchor points they have selected into useful groups and subgroups, and in some embodiments, may further be configured to suggest content (e.g. advertisement) based on the user's browsing or tagging history or any user data that has been gathered thus far. The suggestions may be based on results of analytics engine 126 (see e.g. FIG. 23).

The platform layer presentment engine 122 can, for example, based on a user's cursor location or touch input, identify whether identified host content is available for associating with a visualization. Such identification, for example, may be provided by way of the platform layer presentment engine 122 traversing the DOM to identify the object upon which the content is provided, and then generating a highlight or other visual indicator that the content is available for associating with a visualization. In some embodiments, the entirety of the object can be indicated for availability for association (e.g., the entirety of a text block of an object), or in other embodiments, a selected portion is indicated for availability for association (e.g., only the user's highlighted portion of the text).

The platform layer presentment engine 122 serves as a presentation layer rendering engine that is configured to append new source code into the intercepted source code for a webpage being traversed by a user on a corresponding networked computing device, the presentation layer and the original hosted content forming a hybrid output page whereby the presentation layer is overlaid over the original hosted content, and visual anchor points and visualizations are situated and positioned for interaction by the user.

The platform layer presentment engine 122 may, for example, track recognition of website components that can be annotated or otherwise worked, provide an ability to compare that location or information to another location online, and/or utilize various protocols, such as the JavaScript™ protocol, in providing various aspects of functionality and interactivity.

As an example, when users search "Tennis" through Google™ or Bing™ or any word search engine there is a result which is based predominantly on the word "Tennis", and the IP address via which a user is searching. So the result for a user will be Tennis>Toronto>etc. is news worthy about Tennis today, as the basis for the result. In some embodiments, platform 100 may be configured to determine to identify that for the user, "Tennis" is actually thematically different based on the interests of the user.

For example, a user Jack is an avid amateur tennis player and has been using platform 100 to research racquets, balls, shoes and techniques and leaving comments on the locations he is interested in and Edward is interested in Tennis because he's a designer and has been tasked to design a tennis shirt for his company. So Edward's comments and interests related to tennis are more to do with fashion through the ages, famous athletes, and comparable styles from other sports, etc.

Accordingly, in some embodiments, platform 100, through platform layer presentment engine 122 may be configured to provide different recommendations and/or cues as to what else they may be looking for, as it may be configured with logic relating what the user did with in other aspects of the platform with configured and/or tailored suggestions.

Accordingly, some embodiments provide that data stored in an interactive third party layer over a network of visual anchor points (e.g., online virtual locations) is readily available and accessible through comments, tagged elements such as images, text and sound. The presentment engine 122 is adapted to support an ability of a user to draw mark ups, load and/or replace elements via the creation of a skin or layer over pre-existing webpages and content.

The layer may act as a grid where the tools such as pins, brushes, images, graphics, interactive comment boxes, live and recorded video and file sharing may be loaded and persist in place—allowing a user or group to personalize their website experiences.

In some embodiments, platform 100 is configured to load virtual layers, anchor points, and user content after the website has loaded, and is reactive to the site. That is, a user would not be affected by platform 100 even if platform 100 is running in the background. For example, platform 100 may utilize "lazy loading" which only loads a pre-determined number of content elements, and only loads the subsequent content if a user scrolls down or navigates to it.

In some embodiments, the presentment engine 122 may be utilized in relation to an advertising and/or channel partnership tool where by a user opts into a network which posts promotions and sponsored content over associates content as determined by the CMS and its administrators. For example, a user may pay to see what a given individual has posted and where, website, location, person, institution partners may collect data on user activity, or in some scenarios, an alternative advertising platform may be provided "overtop" of a website or webpage.

Tagging a Content Element

A content element on a webpage of a website may be categorized into three major categories: published content, public content and hosted content.

Published Content which is found in its first published location generally would not move from that location unless it is taken offline entirely. It may be copied to a new location in some events. In this case, platform 100 may, through engines 114 and 116, harvest a URL and any necessary associated HTML elements in a format that can be stored as a stable tag location. Platform 100 may in some embodiments be configured to tag a content element at its original location where it has been first published. This way, platform 100 is configured to draw users back to an original source for the content element, thereby preventing against piracy. In addition, tagging a content element at its original location may provide context for understanding the content element and help encourage original content creators to create more content online.

A hosted content element is a content element that either has an embedded link to its source location or is searchable via word search or image repository search. Platform 100 may be configured to implement an intelligent hash algorithm, via Virtual Anchor Point Engine 118, to track and find a stable tag location for placing a visual anchor point. In some embodiments, platform 100 may cause source code/DOM extractor 114 to examine a DOM tree associated with a webpage (or other, related webpages, such as those identified by processing the source code to identify hyperinked information), and extract data representing source information of a content element on the webpage.

A short list of candidate locations online can be established by either URL matching, or databases querying. For example, searches may be conducted against one or more image databases or word search engines, such as Google™ search, or by parsing and/or processing source code of the website itself.

A hosted content element may have a link associated, is found in a database, or is original to the website. Next, engine 118 may be configured to perform an intelligent hashing algorithm to heuristically track and assess the content elements in the DOM to assess if it has enough similarity to the requested content element in the hosted location. In some embodiments, to save memory and processing resources, a pre-defined number of elements nodally proximate to the content element is searched, for example, conducting a breadth first search up to a particular level, limited level of depth to assess similarity. Accordingly, based on this limited implementation and search, resources can be saved as an exhaustive search is avoided, but a trade-off is made between quality of heuristic search and use of processing resources.

The similarity may be assessed based on a pre-determined threshold of similarity as described herein. A first case is that the elements match up perfectly—e.g., being the exact same version of an image or paragraph. The second case is that the requested content element in the hosted location is a copy of the content element in the DOM associated with the webpage in some way, for example, the latter may have file numbers based on a timestamp that indicates it is a file that has been generated after the other content element. For example, one may have a file name filename.jpg010203 and the other content element may have a file name that is filename.jpg01020304, though both may be the same image as per the reference database. What this means is that the user could be requesting to tag a sentence from a paragraph and by extension an article. In this case, platform 100 may be configured to tag the content element where the user has requested, at a stable tag location as it is has determined that they are in fact the same.

In some embodiments, platform 100 may be configured to examine a context of the content element before determining a stable tag location. For example, if a user has requested to tag a content element that is a sentence such as "my mother is Italian", platform 100 may recognize that this sentence can be generic and found in different stores. To assess the veracity of one or more candidate locations as determined based on DOM, platform 100 and engine 118 may be configured to examine the context of the element. The nodes of the DOM are traversed by accessing linkages between different nodes to determine how the node is structured, and then using tree traversal approaches to inspect neighboring elements up to a predefined level of depth.

For example, when a user requests to tag a sentence, engine 118 may review data proximate to the content element in the DOM and use the data proximate to the content element, along with the candidate location, to form a tag information for generating a visual anchor point. The data proximate to the content element may include, for example, underlying supporting data and elements that stabilize a tag location. In other words, a stable tag location may be determined based on information proximate (e.g., above or below, sideways in a tree data structure) a content element from the DOM associated with the webpage on which the content element is found. For instance, the supporting data may include: the paragraph <p> it lives in, the top line URL as in www.cnn.com, the page URL as in www.cnn.com/article 01 and the sub-URL as in www.cnn.com/article01-section 01/Asia.

In some embodiments, tag information may include data elements such as a <p> or a <I> within the DOM and HTML which hosts the content element. In some cases, a query to one or more global image databases may be conducted to secure the correct image and associated images that may be the same images as the image element the user has requested to tag.

Platform 100 may be configured to review and look for DOM markers to determine a tag information for generating visual anchor points. For example, a tag information may include: HTML location of element, underlying link, and/or DOM elements above and below the content element (which may be a reference to an image or paragraph). The tag information is configured to stabilize the tag and allows for the tag to persist when the information moves or changes shape. When a tagged content element is detected to have moved in the site, platform 100 may be configured to review the tag location and tag information, and re-establish the veracity of the location if necessary.

Once tag information has been generated, platform 100 may be configured to place one or more visual anchor points based on the tag information. The visual anchor points may be placed at a pre-determined location over the webpage, usually overlapping with a portion of the content element. In some embodiments, for consistency, platform 100 may be configured to select the top left or top right corner of a selected content element as the location for tagging that content.

In some embodiments, a user may request to tag a content element that is not text, for example, it may be a photo, an image, a video or audio. For an image element, platform 100 may be configured to capture a source of the image through a query to one or more database. The source of the image may be the destination as represented by a stable tag location, based on the search results from the query to the one or more databases. For example, platform 100 may be configured to, via Virtual Anchor Point Engine 118, run a query on the URL of the image against one or more image databases, and check if the image is in the location it was first pushed online.

Platform 100 allows a user to stay on a website while gathering information or annotating content of the website, since it presents the visual anchor points and the associated user-generated content as an overlay on top of the webpage, without inferring the user's ability to read or otherwise enjoy the website. The user may be researching a certain topic, and would like to dive into the search results later and doesn't want to leave the page he is on. Platform 100 in this case is configured to enable the user to stockpile the search results and information for a later purpose.

For example, engine 118 may be configured to obtain an URL of a content element from a DOM associated with the webpage on which the content element is found. The URL may or may not have a series of third party elements that have nothing to do with the address of the content element, such as Google™ analytics, cookies, and/or Google™ ad words. As an example, a URL http:/mashable.com/2017/09/11/idris-elba-stephen-king-dark-tower-acting-career-literacy/?utm cid=hp-h-1#sgQspgry9kq2 may be found in a DOM for a content element that is an article on Idris Elba and Stephen King. Platform 100, via source code parsing engine 116, may be configured to cut the URL to http://mashable.com/2017/09/11/idris-elba-stephen-king-dark-tower-acting-career-literacy, which may form the stable tag location for the content element.

In addition, users may request to tag content element on sites that have constant update. For example, www.cnn.com may have a different front page story in 12 hours. Platform 100 may be configured to recognize dynamic websites such as www.cnn.com and facilitate stable tagging at different locations. For example, a user may request to tag an article at the front page of www.cnn.com, which may be taken off the front page within 24 hours. The user may or may not know that the article is actually categorized under Regional/Business and hosted at www.cnn.com/regional/business.html, which is a different webpage than the front page of www.cnn.com, even though both pages belong to the website www.cnn.com.

Virtual anchor point engine 118 may be configured to generate a visual anchor point and cause presentment engine 122 to place the visual anchor point at the front page of CNN website (i.e., www.cnn.com), per the user's request, and at the same time, virtual anchor point engine 118 may also generate a second visual anchor point and cause presentment engine 122 to place the second visual anchor point at www.cnn.com/regional/business.html, which is a more stable tag location for the article that the user has requested to tag. The visual anchor point placed on the front page of www.cnn.com may be left there for as long as the article is still there, and if CNN updates their website and removes the article from the front page, the user may still find the second visual anchor point under the regional/business link. This way, a user's visual anchor points are not lost even when the initial webpage at which the user has found the content element is invariably updated or otherwise modified. The user may still find the tagged content from the browser extension GUI described in this disclosure.

In some embodiments, platform 100 may be configured to present, at a user's request, a webpage as it was presented to the user on a specific date (e.g. on May 2, 2017). It may also present the webpage as it was presented to the user at a specific time (e.g. at 10 AM on May 2, 2017), if so requested. Platform 100 can reconstruct and display, to the user, the webpage from a time in the past, even if this webpage has since been modified in any way.

This is made possible because Platform 100 may be configured to store all source code, including all HTML script, of every webpage a user has visited at any given time and date. Platform 100 may choose to store every webpage the user has visited regardless of whether the user has in fact tagged any content element. Platform 100 may also choose to only store the webpages a user has tagged. Platform 100 may also be configured to retrieve the webpages from third party databases that keep track and store every single webpage of every single website periodically. Once a user request for presenting a webpage from a specific date or time (in the past) is received, platform 100 may be configured to retrieve the relevant source code and URLs of the webpage, reconstruct the webpage based on the retrieved information, and present, if any, visual anchor points and user-generated content that were presented on the webpage at the specific date or time. This way, platform 100 can deliver, to the users, the broad context on which a tagged content element has been based.

A public content is a content element that is in the public domain. Such content may not have licensable rights associated therewith online or in print. Platform 100 may similarly examines a DOM associated with the webpage on which the content element is found and determine a stable tag location based on the source information in the DOM. The stable tag information may include an underlying URL pinpointing to a location where the content element was uploaded.

One advantage of platform 100 is that it may not have direct interaction with the website that a user is browsing and tagging. Platform 100 may be a browser plugin that is downloaded and installed over a browser, and is configured to parse together all necessary elements as a third party and work to find stable tag locations for content elements and to place visual anchor points on the content elements without interrupting, changing or partnering with the websites. Platform 100 can make stable, yet dynamic markers on webpages by only reading the site and site elements, as platform 100 generates its feedback by leveraging only front facing tools that are available in the presentment of any website. By carefully examining the sties and processing the source information of content elements on the sites, and by stripping away unnecessary elements from the source information to generate a stable tag location, platform 100 is configured to render a user-friendly, efficient GUI over the websites.

Platform 100 is configured to provide an overlay interface to the user on top of the website the user is visiting and therefore rewards content contributors. This is made possible by the ability of platform 100 to dynamically examine and sort HTML, URLs and DOM in an intelligent way.

Figure 21A:
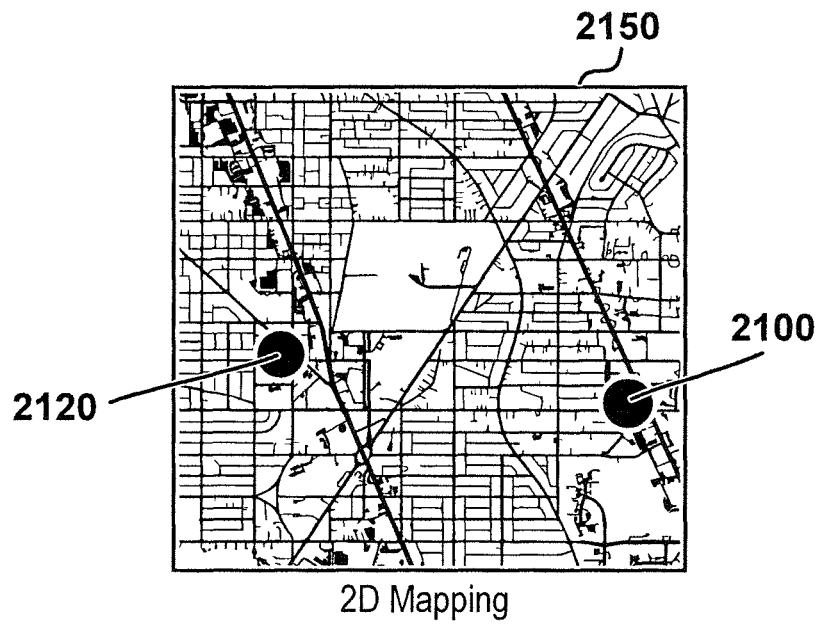
FIGS. 21A and 21B are sample representations of visual anchor points being mapped to 2D and 3D maps, according to some embodiments.
Figure 21B:
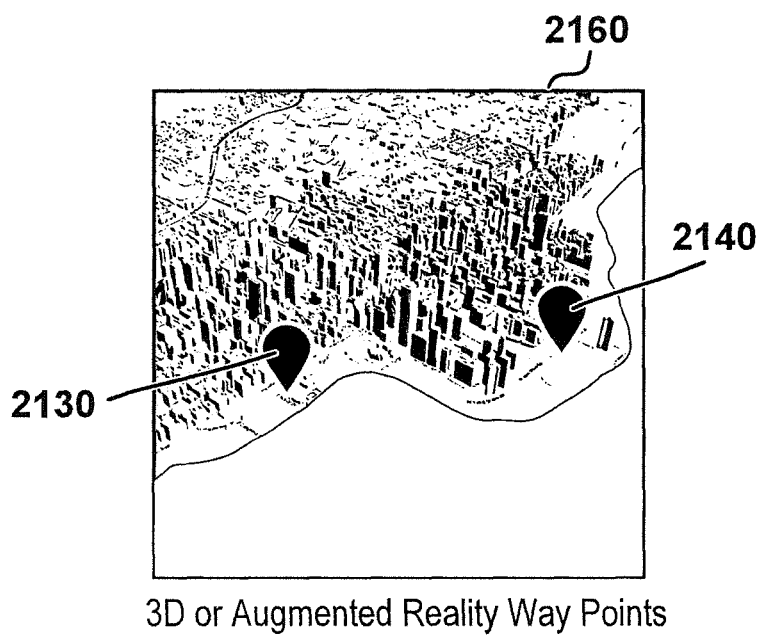

In some embodiments, a user may request to tag a map on a web browser. Maps tend to scale in and out, and therefore presents a challenge for stable tagging. Platform 100 may be configured to capture source information of the map, the source information may include an URL which may comprise data representing a scale and an area of the map that the user has requested to tag. Platform 100 may be configured to process the URL and determine a stable tag location based on the URL. For example, various extensions in the URL may be cut or recorded. Platform 100 may be operable to pinpoint a search return to a map as a third party overlay, and to present a visual anchor point over a corner of the webpage. This way, the tagged map may also be zoomed in and out without losing the visual anchor point. For example, FIGS. 21A and 21B show sample representations of visual anchor points being mapped to a 2D map or a 3D map, where visual anchor points 2100, 2120 are placed on 2D map 2150, and visual anchor points 2130, 2140 are placed on a 3D map 2160.

Once Platform 100 has generated a stable tag location and corresponding tag information, virtual anchor point engine 118 may generate one or more visual anchor points based on the tag information. Then platform layer presentment engine 122 may be configured to then present the visual anchor points on the website.

In some embodiments, presentment engine 122 may be configured to rely on background super sets of Javan™ scripts to display the overlay of anchor points and user-generated content. Fonts and layout of the GUI of the browser extension may be simplified in order to host a dynamic user interface.

Platform 100 may be adapted to work across different sites. For instance, each site template and each Content Management System (CMS) may have slightly different CSS drivers. This means that as a dynamic platform which renders tags reactively over a site, platform 100 is configured to have adaptive functionality to various site configurations. Platform 100 may be configured to create CSS stabilization across the entire design and CSS landscape of the internet. For example, platform 100 may be configured to recognize Java Bundles, API's, HTML layout, looks for consistencies related to site build techniques or build types such as WIX or WordPress™ then adapt the best version of the user interface for the specific web site a user is on. For example, in some embodiments, font of the GUI generated by platform 100 may be altered due to site configuration.

In some embodiments, platform 100 may be configured to first identify taggable or tag-able content elements, and once identified, display a visual layer over a taggable content element if and when a user's cursor hovers around the taggable content element. The visual layer may be displayed in such a way as not to obstruct the user from still reading the content element. For example, the visual layer may be a semi-transparent layer. For another example, the visual layer may be entirely transparent but with a visual boarder.

In some embodiments, a website may be hosted in multiple domains or networks. As an example a site like the New York Times™ at https://www.nytimes.com/ is fundamentally a completely different site from region to region. In each region the top level URL appears exactly the same, but the content and URL may be different. Platform 100 may be adapted to homogenize the returned data to its database so users can sort and filter information logically. The returned data may include regional content, such as time of day, IP Address, POP or security. For example, a user would expect that an article tagged on the website of New York Times™ when they happen to be in France would appear in their feed when they are in another area like Los Angeles. Platform 100 may be configured to sort through the sub domains and sub URLs of New York Times™ website to establish the top level URL and simplest path of placing and keeping the tag or visual anchor point in the server based on the user's filter or location for the content. This way, the user can request the platform to store the content in a group or under a key term. In other words, platform 100 may recognize that although the user has accessed an alternate version or alternately hosted version of a site, it is all part of a central URL, e.g. https://www.nytimes.com/. Platform 100 may locate and place a visual anchor point at articles appearing in both a local version of the Times and the international (central) version of the Times, as both articles may be traced back to the same underlying URL, which becomes the stable tag location.

In some embodiments, the websites may be HTTPS sites, firewalls, paywalls and password protected sites. As platform 100 may be a "read only" tool, it is fairly easy to implement features of the platform 100 over secure sites and sites that require accounts. For instance, an image element inside Facebook™ may be tagged, Facebook™ being an example of a password protected and secure site. Platform 100 may also tag URLs linking to inside stores or advertisements as the platform is non-invasive in operation. In contrast, a platform like Pinterest™ cannot tag any content element from Facebook™ without Facebook™ having embedded a Pinterest™ SDK. By staying fundamentally read-only, platform 100 may navigate anywhere with the network. This is not to say that platform 100 may hack a password protected website, but rather, platform 100 may persist over the password-protected website properly, once a user has logged into the website, and uses platform 100 as an overlay on top of the website.

In some embodiments, platform 100 is configured to generate a stable visual anchor point through tagging an "article page" or the underlying URL of where content came online. This way the platform has a fall back design which re-establishes a conversation or tag on top of the article page, even when the article may be rotated out of the front page. The platform may determine: 1. if is there an underlying URL/link for the article; 2. if it is the URL within this domain; 3. If the exact same content is located at the URL. Then platform 100 may determine to move the tag to the underlying URL, or offers to move the tag to the underlying URL, and the user may be presented with a pop-up window showing links and displays the underlying URLs. The pop up may accompany the comments box and display the underlying page.

In some embodiments, platform 100 is designed to determine when a particular link, content, or component is related to an actual underlying webpage or website. For example, there may be content aggregation websites (e.g., Mashable™) that collect and aggregate links to content provided by other websites.

The virtual anchor point engine 118, in some embodiments, is configured to provide persistent anchor points that are defined not only at the level of a website link aggregator, but may also be configured to "look past" the aggregator and also provide anchors and/or visual objects in relation to the underlying website.

In some embodiments, the platform layer presentment engine 122 is configured to account for inconsistencies and/or irregularities in website presentment, including, for example, determining when URLs relate to a same underlying article. The following method is described for providing persistence in visual anchor points despite different URLs for similar webpages. Three visual anchor points are found, and a description is described below in relation to navigation of the pages.

Underlying URLs are created, for example:
1. Platform 100 is directed by user navigation to a webpage (e.g., mashable.com), and to one of the text links on the banner of top headlines ("Article1").
2. The URL of Article 1 is recorded, and it may have some analytics tags (e.g. Google™ tags) in its URL. In this case, the URL is: http://mashable.com/2016/08/11/simone-biles-photos/?utm_cid=hp-hh-pri#CoOhHXOj05qo ("URL 1")
3. Place a visual anchor point on an image found in URL1 ("Pin1")
4. Navigate back to mashable.com and find the headline for Article1 in the body of the front page. ("Article2")
5. Place a second visual anchor point (e.g., another pin) the image-link. (Let's call this Pin 2)
6. Navigate through the image link to request Article 2.
7. Determine that the URL of Article2 is different from the URL of Article 1. In this case, it is: http://mashable.com/2016/08/11/simone-biles-photos/#CoOhHX005qo ("URL2")
8. In URL 2, place a third visual anchor (e.g., a third pin) on a different image than the one tagged by Pin 1. ("Pin3")
9. Close all tabs related to these steps;
10. Open three new browser tabs, one for mashable.com, one for URL 1 (Article 1) and one for URL 2 (Article 2);
11. As shown by the browser tabs, Pin1 is on Article1, Pin2 is on the front page and Pin3 is on Article2;
12. For the truncated URL that being captured, platform 100 automatically modifies the URL such that the URL portion to the left of '?' or '#' is truncated to the following portion: http://mashable.com/2016/08/11/simone-biles-photos/

Accordingly, both Pin1 and Pin3 show up on Article1 (URL 1) and both Pin1 and Pin3 show up on Article 2 (URL2). Though they have different URLs, the reality is that Article 1 & Article 2 are really the same article, as indicated by the image source of the images.

In some embodiments, an analytics engine 126 (see e.g., FIG. 23) is provided that can be utilized for conducting various features of analysis using stored data from storage 124. For example, associations may be created and applied in a learning algorithm to generate various predictions, or refine information used in the generation and assignment of virtual anchor points. In some embodiments, the analytics engine 126 is utilized to generate predictions of trends, outcomes, or next actions based on historical patterns.

In some embodiments, information based on user created waypoints is grouped by the analytics engine 126 into groups and subgroups of content for the purposes of creating associations in the content as defined by the computer program and the user and in some cases learned by the computer program through the process of refining the association of the waypoints and information entered by a user in relation to the location or other locations with relevant topical content or comments loaded in waypoints by a user.

The analytics engine 126 may generate instruction sets, for example, to modify operation aspects of the platform 100 or generate advertising information, for example, to tailor information available to a user to a client who may be interested in user data. The analytics engine 126 may use site specific waypoints and compare the information to which it is relating on a webpage to the same information on another webpage, to find and follow content and users through their patterns online via waypoints, among other features.

Figure 9:
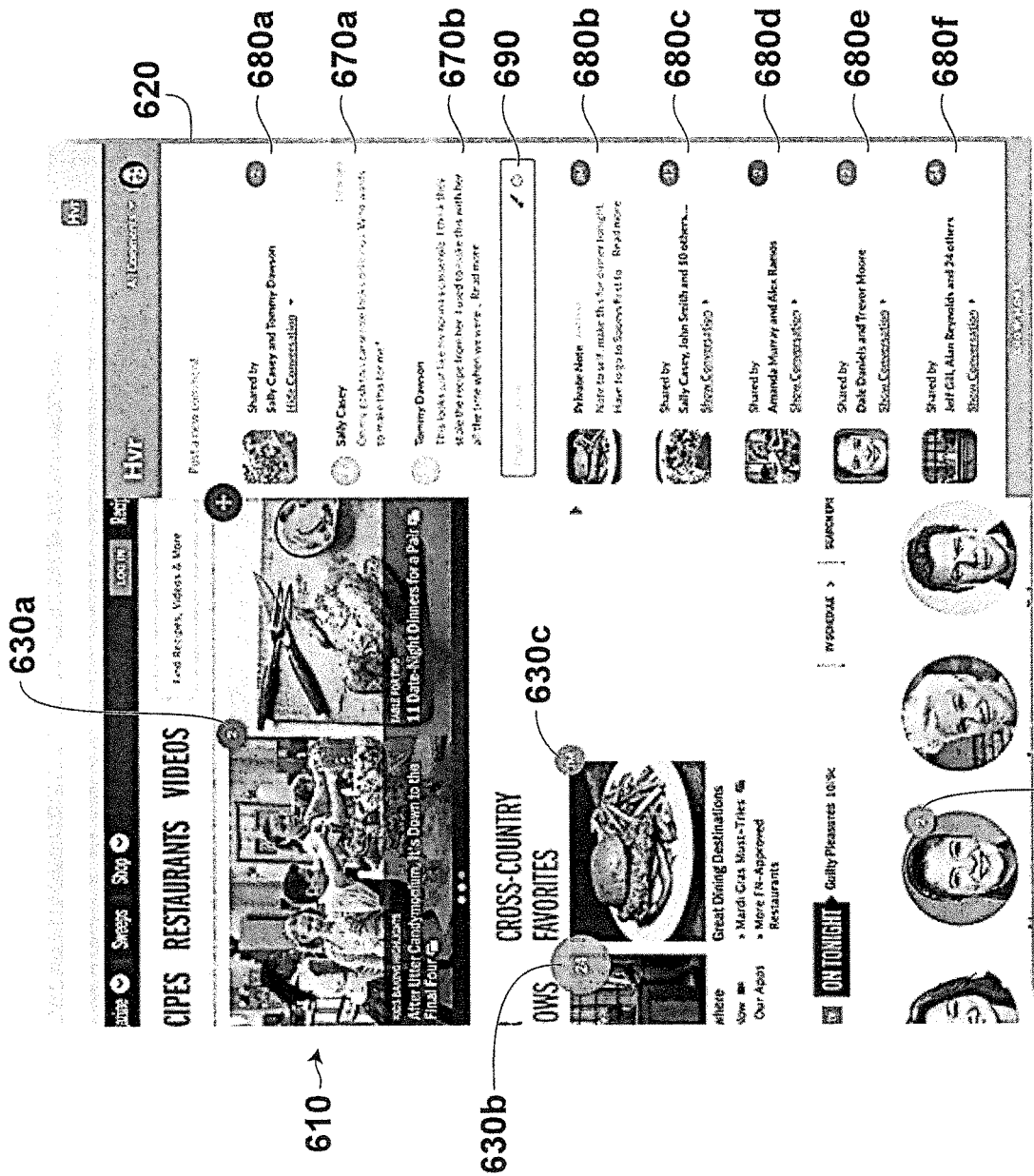
FIG. 9 is an example screenshot illustrating an example browser with visual anchor points, according to some embodiments.

For example, such a browser extension is shown in FIG. 9. The browser extension may be depicted as a sidebar 620 which interoperates with visual anchors/waypoints (illustrated as the circles associated with content, such as images, text, videos). For example, in FIG. 9, there are numbered circles, which are visual anchor points 630a-630d, shown over various images on the webpage. The visual anchor points may be displayed by presentment engine 122 without affecting operations of the underlying website.

In some embodiments, platform 100 may be configured to identify a variety of file or data as tag-able. For example, the list may include links, sentences, paragraphs, headlines, by lines, images, gifs, video load screens and entire URLs. Then the user can sort the tag, either publicly or privately, into a group or category.

As described earlier, a taggable content element may be, in some embodiments, indicated by a visual layer that allows a user to still consume the content element. The visual layer may be for example a semi-transparent overlay on top of the content element. When a user sees visual layer as he or she hovers the cursor over a content element, the user then understands that he can tag the content should he wish to. The level of transparency (or other visual factor) may be used as a visual indicator in relation to various aspects of the content element. For example, a higher level of transparency or a color may be changed in relation to the overlay to indicate, for example, a classification associated to the overlay element by the user, or in some cases, to indicate that dynamic content of the webpage has shifted the location of the content and accordingly, the user should be aware that the overlay element is no longer in the position that the user originally placed it (e.g., an image was moved from the front page of the online publication to an archived page).

The engine 122 may be configured to automatically indicate modifications by way of including color or transparency information in an encapsulated package of display control instructions, which when executed by a user computing device, cause the rendering of the overlay including relevant overlay elements for a particular view of a page being visited by the user. Users are able to provide comments or annotations at each visual waypoint or anchor point (e.g., User A providing a note indicating that "This dress looks great!"), and these comments or annotations may be stored on storage associated with the platform such that authorized users of the platform, when navigating to the same page or related page, are able to view these visual waypoints and their associated information payloads. In some embodiments, the users are able to add, remove, modify, etc. information stored on the information payload. For example, User B may navigate across the same dress as User A and append a further note indicating that "This dress is available in a small independent store in downtown Los Angeles".

The combination of the overlay elements and the underlying content creates a hybrid view for the user, where the overlay elements are configured to dynamically render based on a data structure that is adapted for periodic and automatic maintenance/update of linkages to establish overlay elements that intelligently track dynamic changes in the website based on computer-implemented approaches to identify and adapt to dynamic changes in accordance with some embodiments of the present disclosure.

The development of such a platform 100 is technically challenging as website content is not originally designed for hosting such a platform. In some embodiments, platform 100 may be configured to use third party image databases to determine if an image is taggable, and if so, determine what the stable tag location may be. Even altered images may be found through image databases or repositories. Platform 100 may through this process locate a source for the image element on a webpage. In addition, platform 100 may relay the image location back to the user. Platform 100 may place an anchor point at the underlying URL of the image, in addition to placing an anchor point at the webpage where the image is first seen and selected by the user.

In some embodiments, platform 100 may be adapted to examine written content above or below an image, to ensure that it is referencing the correct image and placing the tag to the proper underlying URL. If Platform 100 determines that the underlying URL is actually a uniquely new image, it may determine to tag instead the image at the location where the user has first found and selected.

Figure 2:
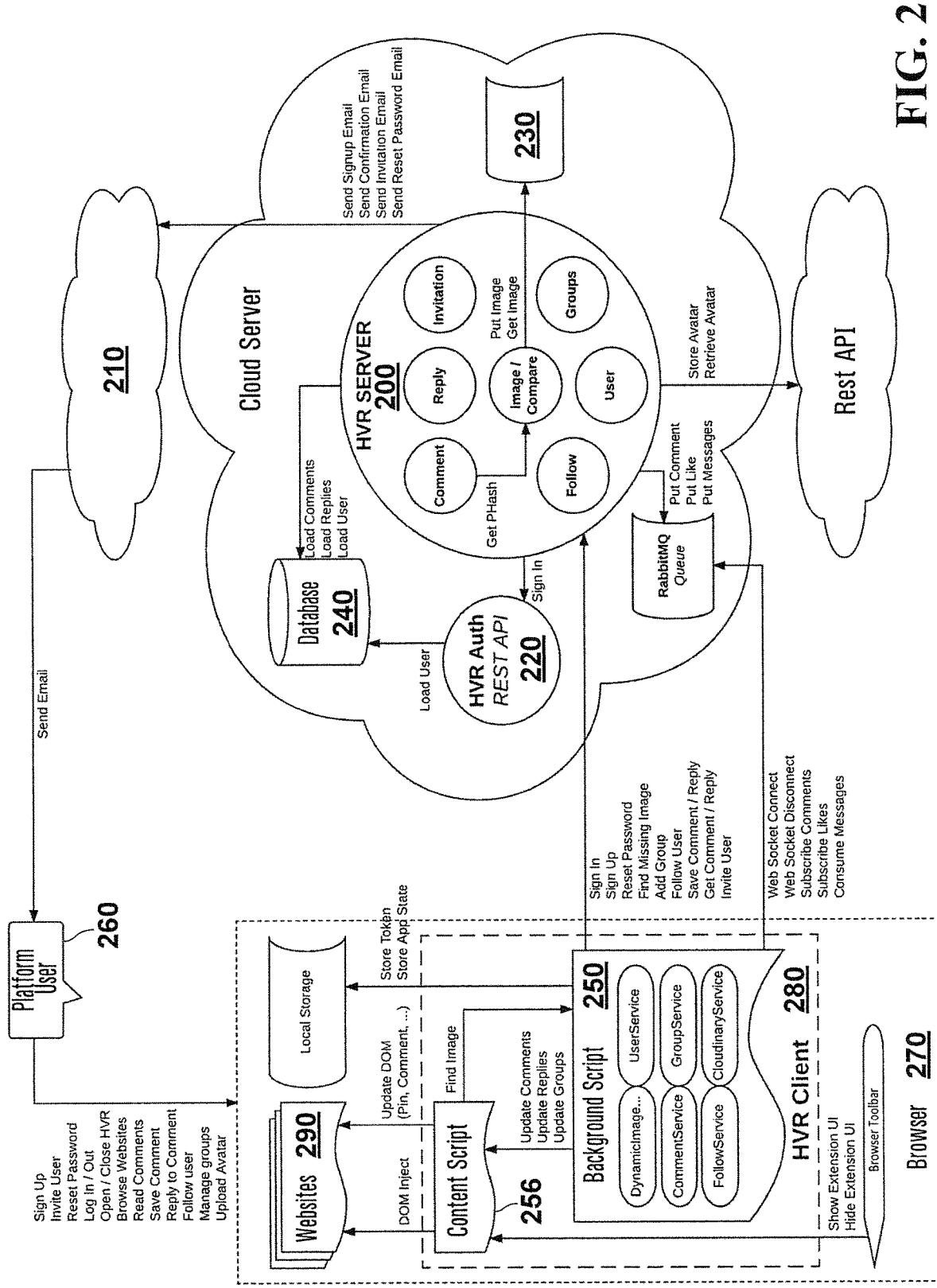
FIG. 2 is an example system architecture according to some embodiments.

FIG. 2 is an example system architecture according to some embodiments. HVR server 200 may be an example server hosting platform 100. Server 200 may be a server providing Representational state transfer (REST) web services via a REST API. Users 260 may be visiting websites 290 via web browsers 270. A user 260 may have a HVR client program 280 installed on browser 270. Client program ("client" hereinafter) 280 may be installed in the form of a browser plugin. Client 280 may be configured to be turned on or off by a user 260, or may be set to be always running in the background once installed.

HVR Server 200 may send e-mails to users 260 through cloud-based e-mail delivery platform 210. HVR Authentication module 220 may authenticate users based on user data stored in database 240. Database 240 may host user data such as user login information, user profiles, user comments, replies, and other user-generated content. Database 240 may be an Azure Cosmos database. Database 230 may be a database hosting image or text repositories. For example, Database 230 may be a Redis database. When a user 260 requests to tag a content element on a webpage with comments, server 200 may run an intelligent hashing algorithm (e.g., "Get PHash"), review source code information such as DOM and HTML of the webpage to obtain source information of the content element, and send an image or text query to database 230. Server 200 may include additional software modules or engines configured to handle a suite of user actions such as replying to a comment, inviting other users, following a user, managing a user account and managing group accounts. Server 200 may further store and retrieve user avatars in a cloud-based database. Server 200 may utilize a middleware or exchange server, or a message broker queue (e.g. RabbitMQ) to communicate with client 280 over a network.

Client 280 may run background scripts 250 on browser 270 in order to communicate with server 200 to deliver services on platform 100. Background scripts 250 may include, for example, modules directed to dynamic image service, user service, comment service, group service, follow service, and so on. Background scripts 250 may work with content script 256 to review or update a DOM of a webpage to present a visual anchor point (e.g. a pin) and its associated user-generated content such as comments. Content script 256 may also be configured to present GUI to show browser toolbar or extension on top of webpages of web site 290.

Figure 6:
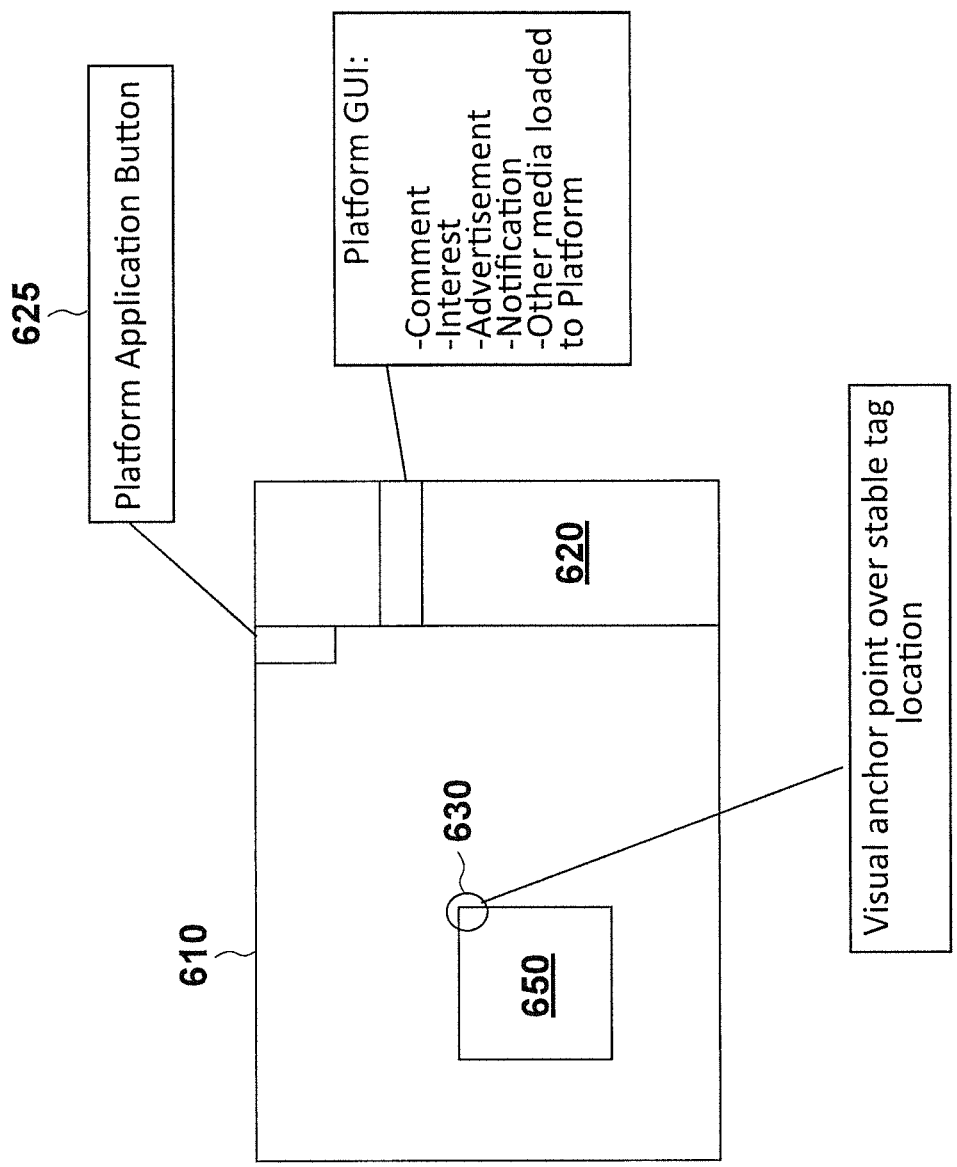
FIG. 6 is a schematic diagram of a browser with visual anchor point, according to some embodiments.

FIG. 6 is a schematic diagram of a browser 610 with a visual anchor point 630, according to some embodiments. As shown, a browser 610 has a content element 650 therein, which is associated with a visual anchor point 630. On the right-hand side of the browser 610, a platform graphical user interface (GUI) 620 in the form of a browser extension or toolbar is displayed on top of webpage. The platform GUI 620 may have a button 625, which may be used by user to hide or display the browser extension.

Figure 3:
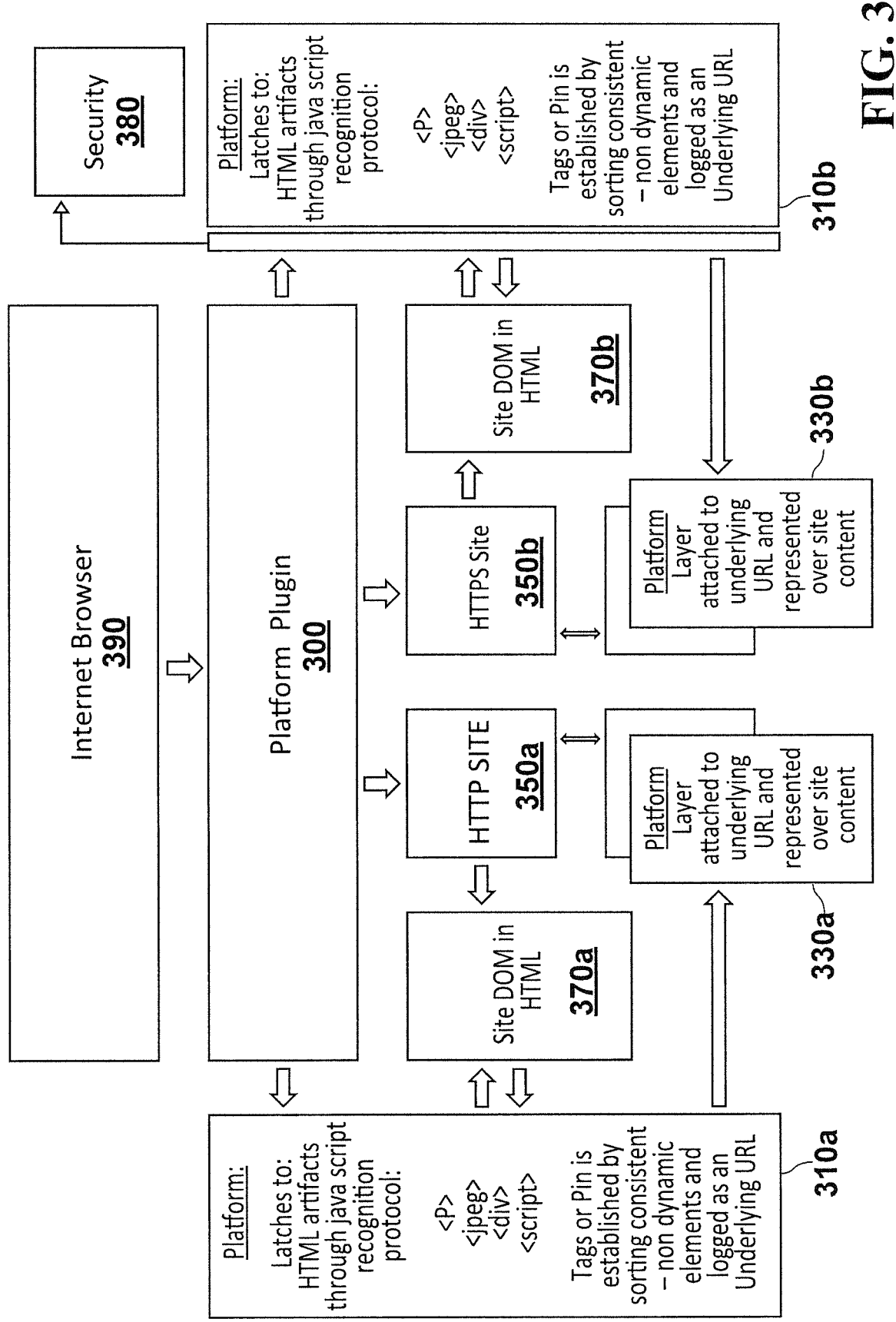
FIGS. 3-5 show various block schematic diagrams of an example platform in operation, according to some embodiments.
Figure 4:
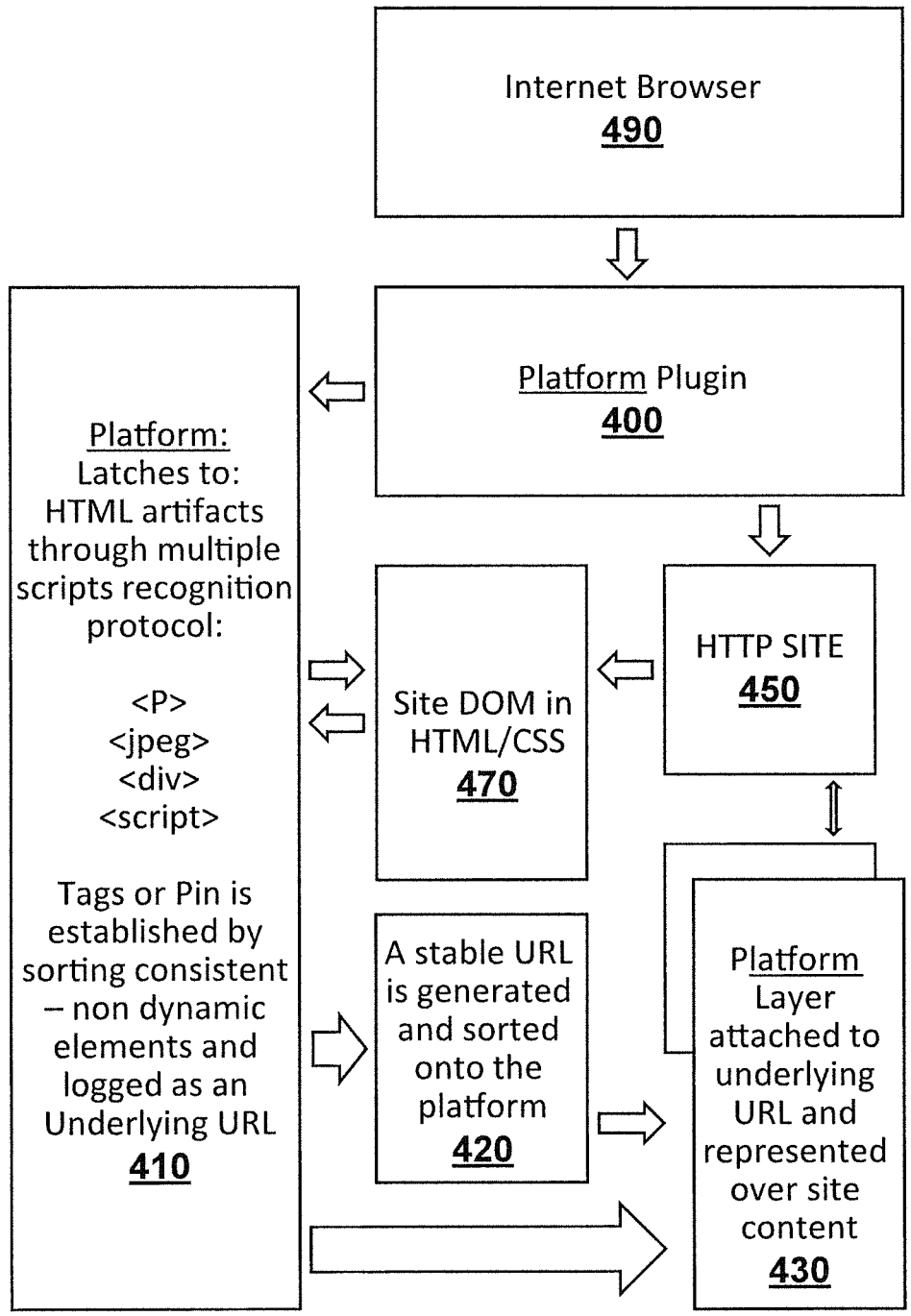
Figure 5:
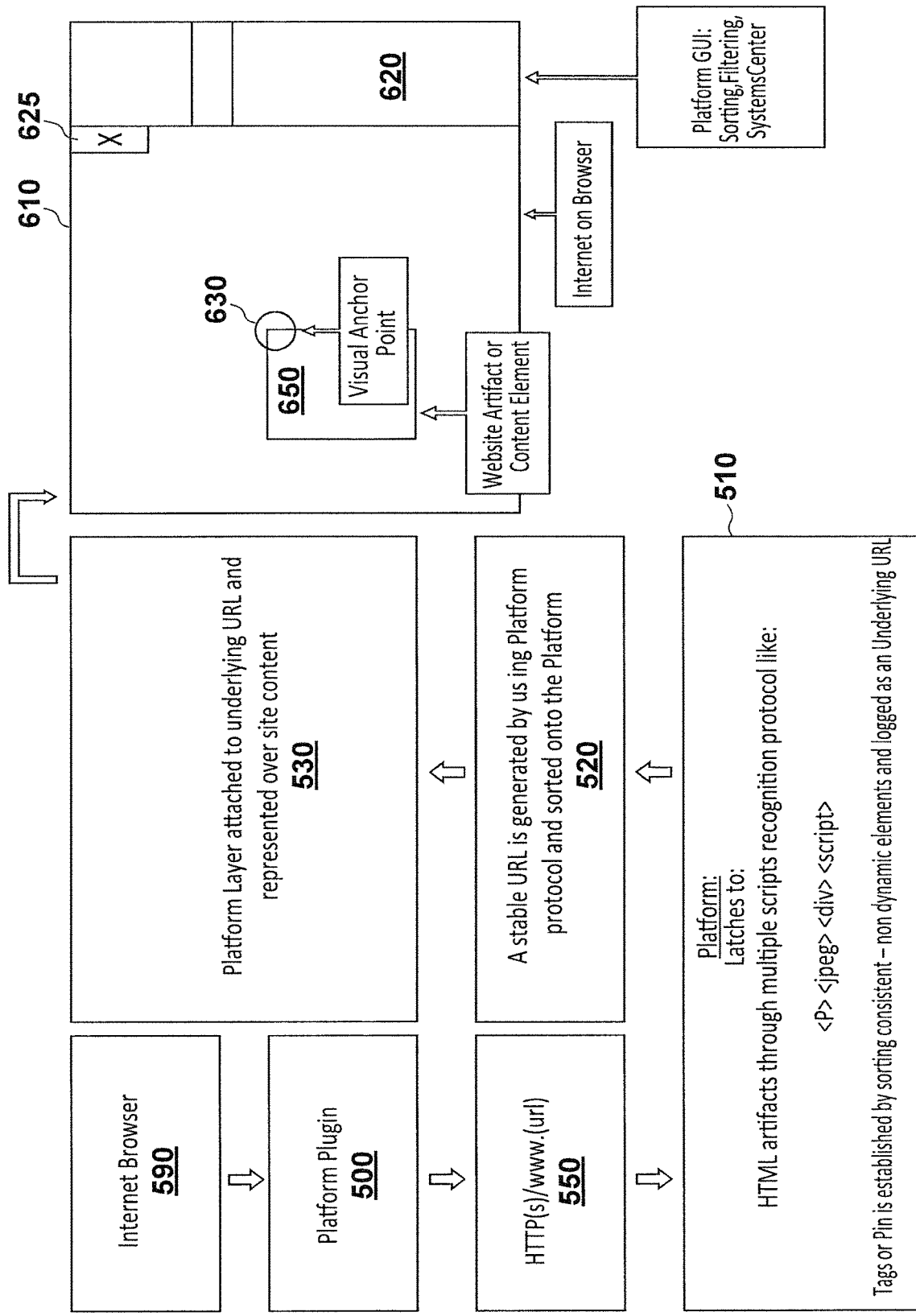

FIGS. 3-5 show various block schematic diagrams of an example platform in operation, according to some embodiments. Platform 100, in some embodiments, is configured to provide a platform plugin tool 300, 400, 500 to an internet browser 390, 490, 590. Through the platform plugin tool 300, 400, 500, platform 100 may provide a visual presentation layer 330a, 330b, 430, 530, presented over site content of website 350a, 350b, 450, 550. The layer 330a, 330b, 430, 530 may be generated by platform 100 based on examining site DOM (e.g. in HTML or CSS) elements 370a, 370b, 470. Platform 100 may through one or more script recognition tool (e.g. Java script recognition tool) read and/or extract DOM elements including but not limited to: <jpeg>, <script>, <div>, <p>, <a>, <span>and <img>, and establish tags, pins, or visual anchor points 630 over a content element 650 by sorting consistent, non-dynamic elements and recognizing an underlying URL (see steps 310a, 310b 410, 510). The underlying URL may be used to generate a stable URL at step 420, 520, the stable URL is an example of a stable tag location of content element 650. The stable tag location and associated tag information may be used to place a visual anchor point 630 over content element 650 in browser 610. Security compliance 380 may be required for HTTPS sites 310b.

In some embodiments, platform 100 may be operable to recognize and extract network elements including: URL, HTML Hash Points, coordinates of a user device location, DOM Tree within the super structure of the site. Platform 100 may also read and extract embedded files such as JPEG's, PDF's, MP3's, webpage elements such as: header, footer, sidebar, border, and etc.

Platform 100 may be configured, in some embodiments, to associate a visual anchor point 630 with one or more user-generated content including user events. For example, user may perform any of the following actions through platform GUI 620: the creation of a time sensitive recall button; the creation of a group chat housed in the recall button; the creation of an advertisement as a button which unpacks with the ad; the creation of a private note; the superimposition of effects or visual elements such as a video, photo, or other text; the superimposition of a site element such as the replacement of a photograph on the site; the creation of multiple recall buttons on top of multiple locations online related to the same comment or comments from the platform, among others. Other types of interactions are possible.

In some embodiments, platform GUI 620 may be configured to provide a user interface element that allows a user to turn on or off "tag mode". For example, the user interface element may be a button. If a user clicks on the button to turn on tag mode, then platform 100 can recognize if and when a user's mouse or cursor hovers on top of a taggable content element, and can indicate to user that such content element is taggable by presenting a visual layer. If a user clicks on the button to turn off tag mode, then platform 100 does not present any visual indication if any content element is taggable. This way, a user may control if and when he would like to start tagging content on a website.

Platform 100 may be utilized, for example, to provide a platform layer 430, 530 supporting content organization and collaboration over top of a webpage or webpages by the implementation of a visually rich graphic user interface 620 and associated sorting tools.

Allowing a user to pin, share and recall various content online and organize personally parsed information to the satisfaction of the user and his or her groupings of other users on the platform may be desirable. A user or account holder on the platform can filter and group's information based on: interest; date and time; location; popularity; who or what else is engaged in that content; similar other content; an amalgam or combination of thematically related or seemingly unrelated characteristics; or a pre-organized request for an outcome particular to a user.

In some embodiments, predictive notifications may be provided based on areas of interest, location, followers and those a user follows, machine intelligence-based analytics may be provided based on visual anchor points, commentary, or user actions received by platform 100. These information may be used to predict conversations and outcomes of threads.

In some embodiments, platform 100 may provide augmented reality (AR) tagging based on data received from a user's mobile device. For example, platform may provide tagging of real world locations based on a physical location of a mobile device. With online references and real-time user-generated comments or other types of content, there may be provided visual anchor points that are operable to interact with a user's geographical location to load websites, display a visual overlay over 3D objects, and support interactions between users in real world and in real time.

In some embodiments, platform 100 may use longitude and latitude (i.e., coordinates) information to tag a location in the real world, and render an augmented reality overlay to a display in Virtual Reality (VR). The rendering may be through a handset or in a browser or map. By adding location and an augmented reality layer to the platform GUI, platform 100 is able to render a visual anchor point at a three-dimensional content element in a viewer. So the anchor point may hover before the user in space as it has been assigned to a given location.

In some embodiments, platform 100 may be configured to use data sources to pin or tag similar images or text by leveraging existing search engines and/or image recognition services and databases. For an example, the same message may be delivered to all content elements that are found to be the same as a particular content element (e.g. an image). Images are often used in multiple locations, image databases that keep track of images online typically know where each image is located online. Platform 100 may be configured to leverage these image databases to tag every single image online that is determined to be identical or near identical to a selected image. In the case of similar images, platform 100 may also find images similar to a selected image, and tag these similar images even though these images are technically different from the selected image.

Platform 100 may be also configured to include image recognition capabilities that can cast comparisons of images. Image recognition may be performed by machine learning algorithms. For example, the platform may create a list of images that have at least one thing in common. The platform then may query all of the image databases as well as the websites that have this element in common, to include the webpages containing images with the common element in a list.

In some embodiments, platform 100 may tag hosted content element even if no third party databases are available online. For example, non-dynamic charts or .xls files that don't fit into the category of image or other types of content element may also be found and tagged. Some charts may have an extension of .xls. Platform 100 may be configured to, with an additional special purpose built repository that stores .xls files and/or other data types (e.g. charts or graphs), tag content elements with corresponding data types. For example, a data type may comprise a non-URL based map coordinates or map elements, which enables platform 100 to tag or layer content elements as a third party over a digital map. A digital map can be overlaid via AR by platform 100 to a given area, so that a user may add visual anchor points to the map and even create a treasure hunt effect to the given area. Another user who may be traveling through the same area, may via platform 100, receive notifications of the visual anchor points, and participate in the treasure hunt.

Another taggable data type may be a specific point from a video or audio file, at a given point in time. That is, the video or audio may be tagged at a point in time.

Platform 100, in some embodiments, may also be configured to use word search to tag all webpages that may contain a given sentence. For example, if a user conducts a search on the sentence "I have spread my dreams under your feet; /Tread softly because you tread on my dreams" by W. B Yeats on Google™, the user may get 2,090,000 search results, each indicating a location that the sentence has appeared: W. B. Yeats, "Aedh Wishes for the Cloths of Heaven". Platform 100 may be configured to tag all these locations at once, over the sentence "I have spread my dreams under your feet; /Tread softly because you tread on my dreams". The tag may be a visual anchor point, or take the form of a question and answer, an image, or a link.

Platform 100 may be, in some embodiments, configured to filter websites and webpages by subject matter. By searching within platform 100 for themes or content, a user can generate a list of webpages online and/or locations in real world where the user may visit. A user may input a topic and choose to see a list of users of the platform that have tagged content related to the topic.

Platform 100 may be, in some embodiments, configured to filter sites by who may have visited such sites. This way, platform users may conduct discrete web searches based on where another user has visited.

Platform 100 may be, in some embodiments, configured to filter search results by layering multiple attributes from the platform. For example, a first user may have browsed websites A, B, C, F before arriving at website D. A second user may have browsed B and A before arriving at website D. So the first user has taken a different route, and discovered additional website, compared to the second user, even though they both have ended up at website D. Platform 100 may recognize these subtle differences in users' browsing history, can determine that some differences are simply non sequiturs, and continue comparing searches or patterns by these two users to look for alignment or differences. For instance, D may be a new pair of shoes both users have decided to buy from D's online store, A is official website for D, B is a running forum, C is an online coupon site and F is a competing brand of shoe. Platform 100 may recognize that the first user has attempted to look for a coupon and also to check out D's competitor. As platform 100 is being used for shopping and research, platform 100 can align these users on what they are both interested in and potentially align them as resources to one another. Platform 100 may also introduce either or both users to similar groups based on their search history and purchase history.

Platform 100 may be configured to filter or sort content based on user accounts, including number of posts and replies, user-by-user based engagement, number of shared posts to other platforms, users invited, groups started by the user, groups joined by the user, cohort analysis, and user's tendencies towards following and unfollowing other users.

Sorting and filtering may also be performed based on user activities such as: sites open on device or browser, sites visited, applications and extensions open, user location, pattern of activity across the web (e.g. how a user tends to visit Amazon™ after browsing for clothes), and number of tags for different content elements.

Sorting and filtering may also be performed based on user tendencies such as when and how a user is likely to visit a particular website: time of day of visit, number of actions per visit, effect of trends such as weather, markets, marketing, politics, and content elements tagged as a mapping tool of engagement.

Sorting and filtering may also be performed based on marketing data and channel partner data, such as rate of adoption of audience with no marketing through a partner, measures of referrals through partners and users, viral coefficient of adoption across all avenues, a heuristic poll of user behavior and thoughts, site-specific cross marketing feedback on engagement, and so on.

In addition, platform 100 may be configured to draw or artistically render over a website or physical space. That is, platform 100 can render: unique tag types by theme, user generated tag types or branded tag types, videos over a site or location, emoji or image in place of a tag, user drawings in a comment box, and/or a third party link.

Figure 7:
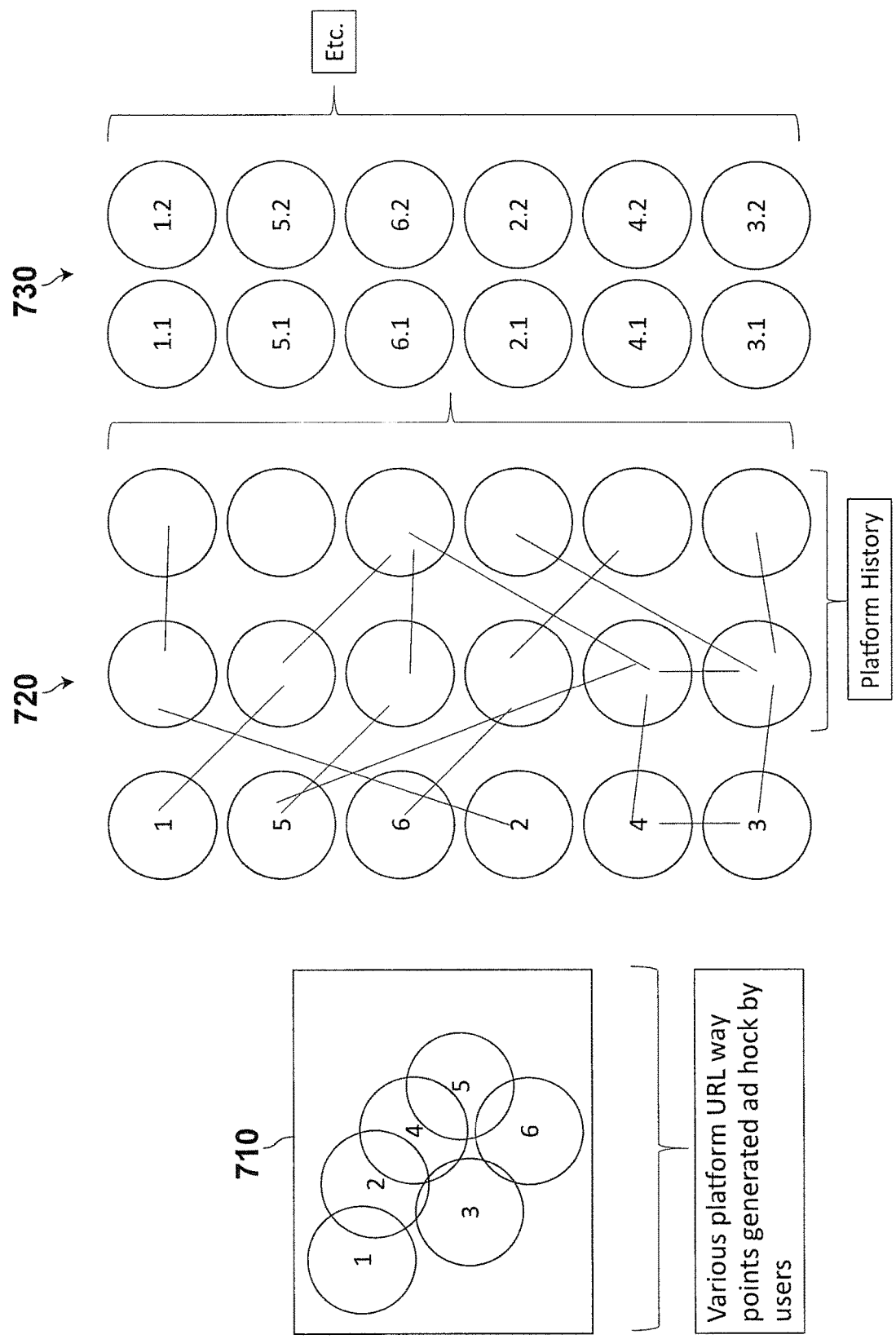
FIG. 7 is an illustration of waypoints and predictions, according to some embodiments.

FIG. 7 is an illustration of waypoints 710 and predictions that may be utilized based on platform usage history 720 stored on storage 124 in relation to annotations, navigations, and interactions with visual anchor points generated by platform 100. The stored historical information 720 may be provided to the analytics engine 126 to generate insights 730, for example, engine 126 may identify and/or estimate relationships between various events, activities, and outcomes.

Figure 8:
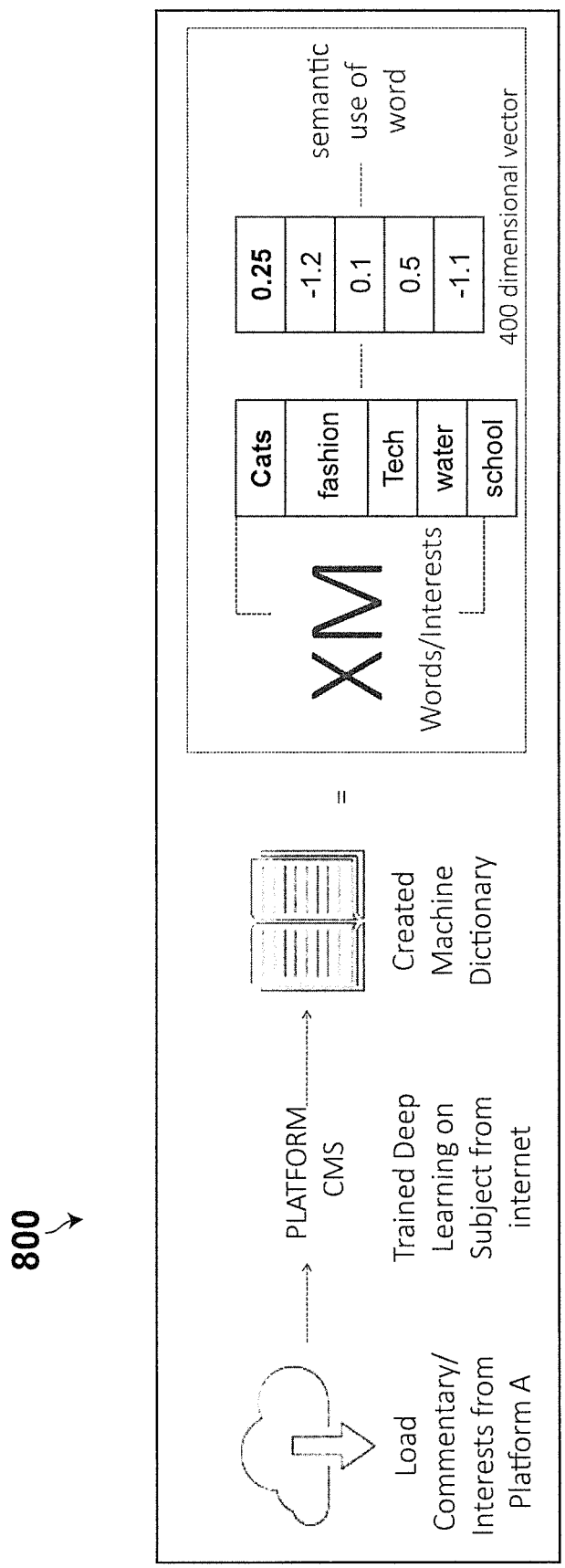
FIG. 8 is a sample diagram illustrating interest generation and/or prediction based on semantic uses of words or phrases, according to some embodiments.

FIG. 8 is a sample diagram illustrating a process 800 for interest generation and/or prediction based on semantic uses of words or phrases. Platform 100 may be configured to load user comments, interests or browsing history, leverage CMS to create a machine dictionary based on the user comments, interests and/or browsing history. Dimensional vector may be used to analyze semantic use of words and to generate intelligence regarding user interests.

Turning now to FIG. 9, an example screenshot illustrating an example browser 610 with visual anchor points, according to some embodiments. As shown, browser 610 shows content of a webpage at a link (e.g. www.foodnework.ca). The webpage has various content elements such as links, pictures, headings for articles, and so on. Visual anchor points 630*a*-630*d* are each presented as a round circle layered on top of its associated content element, at the top right corner of the content element. The round circles may range from being fully transparent to being filled with solid colour. Some visual anchor points 630*a*, 630*b*, 630*d* may further show a number within the circle, indicating a total number of user-generated content such as user comments that are associated with the anchor point. Some visual anchor point 630c may display a user's initials if a user has commented on the associated content element.

Platform GUI 620 in the form of a browser extension is displayed as an overlay on top of the webpage and shows, for each tagged content element, the associated user-generated content in a comment display box 680a-680f. A user may click at a comment display box 680a and expands the box 680a to show user comments 670a, 670b that have been entered by various users in relation to the tagged content element. A user may also enter his or her comment, either as a new comment, or as a reply to one of the existing user comments, at a comment field 690. A user may choose to show all comments by users, or simply comments that she has entered. Moreover, a user may choose to filter the user-generated content by category, such as: public, private, group and follow.

Figure 10:
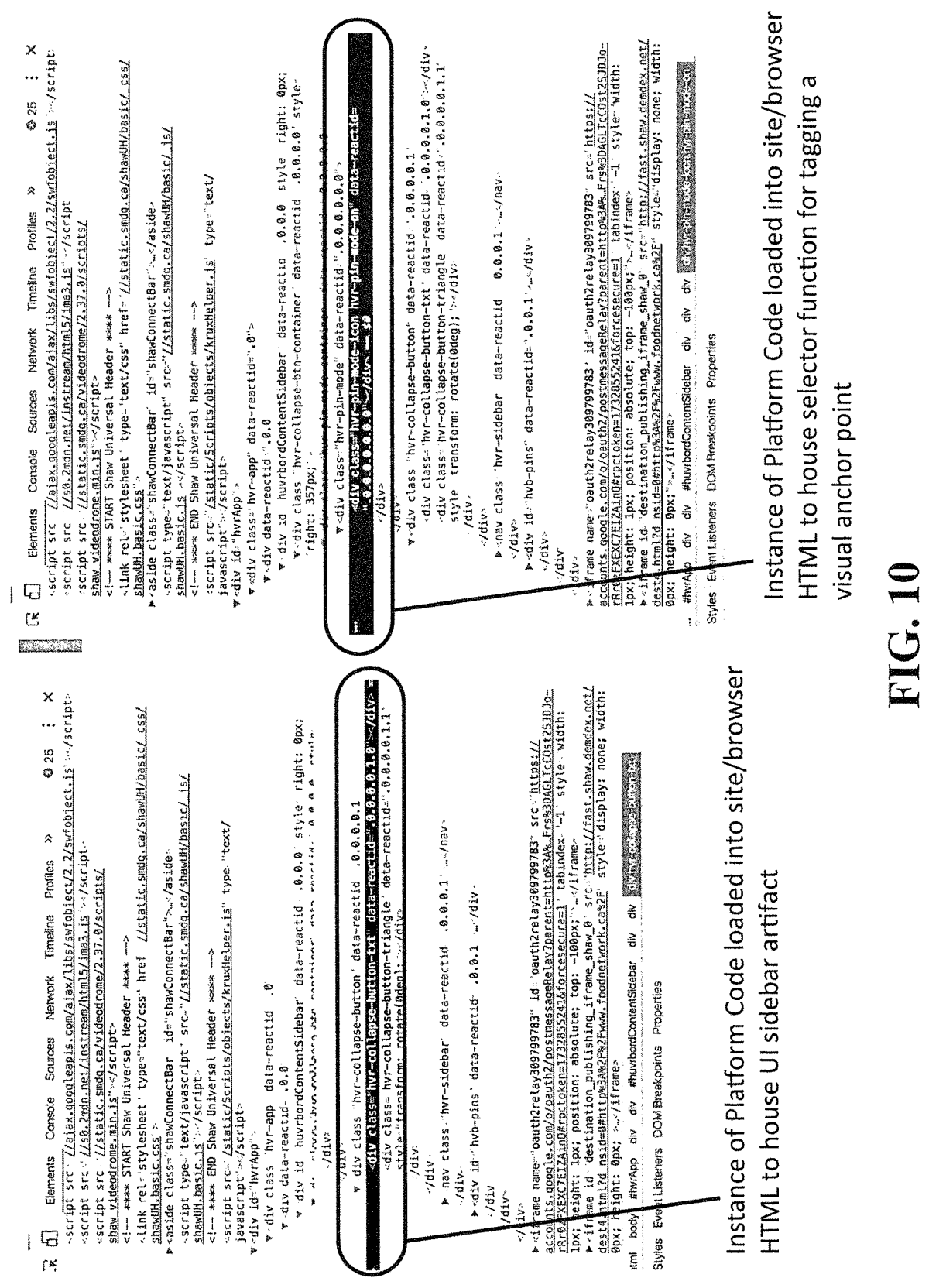

FIG. 10 demonstrates instances of platform code in some embodiments. As shown, platform code may be loaded into browser HTML to display platform GUI in the form of a sidebar or extension on top of webpage. Platform code may also be loaded into browser HTML to show a selector function for tagging a visual anchor point.

FIG. 11 demonstrates instances of platform code in some embodiments. Specifically, platform codes are shown for before or after a tag mode has been turned on.

Figure 12:
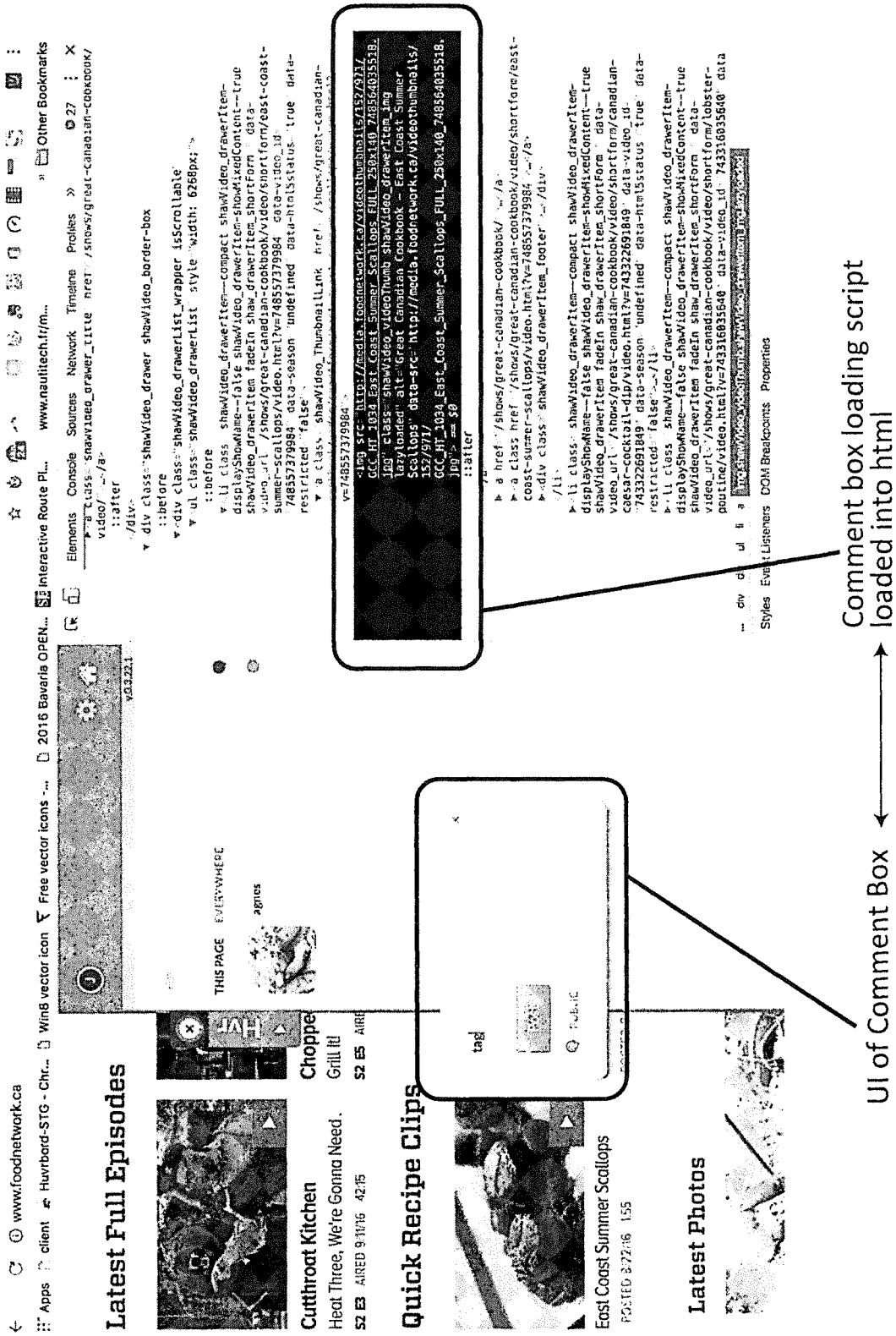

FIG. 12 shows a user interface of a comment box and its corresponding platform code loading the comment box into the browser script, in some embodiments.

Figure 13:
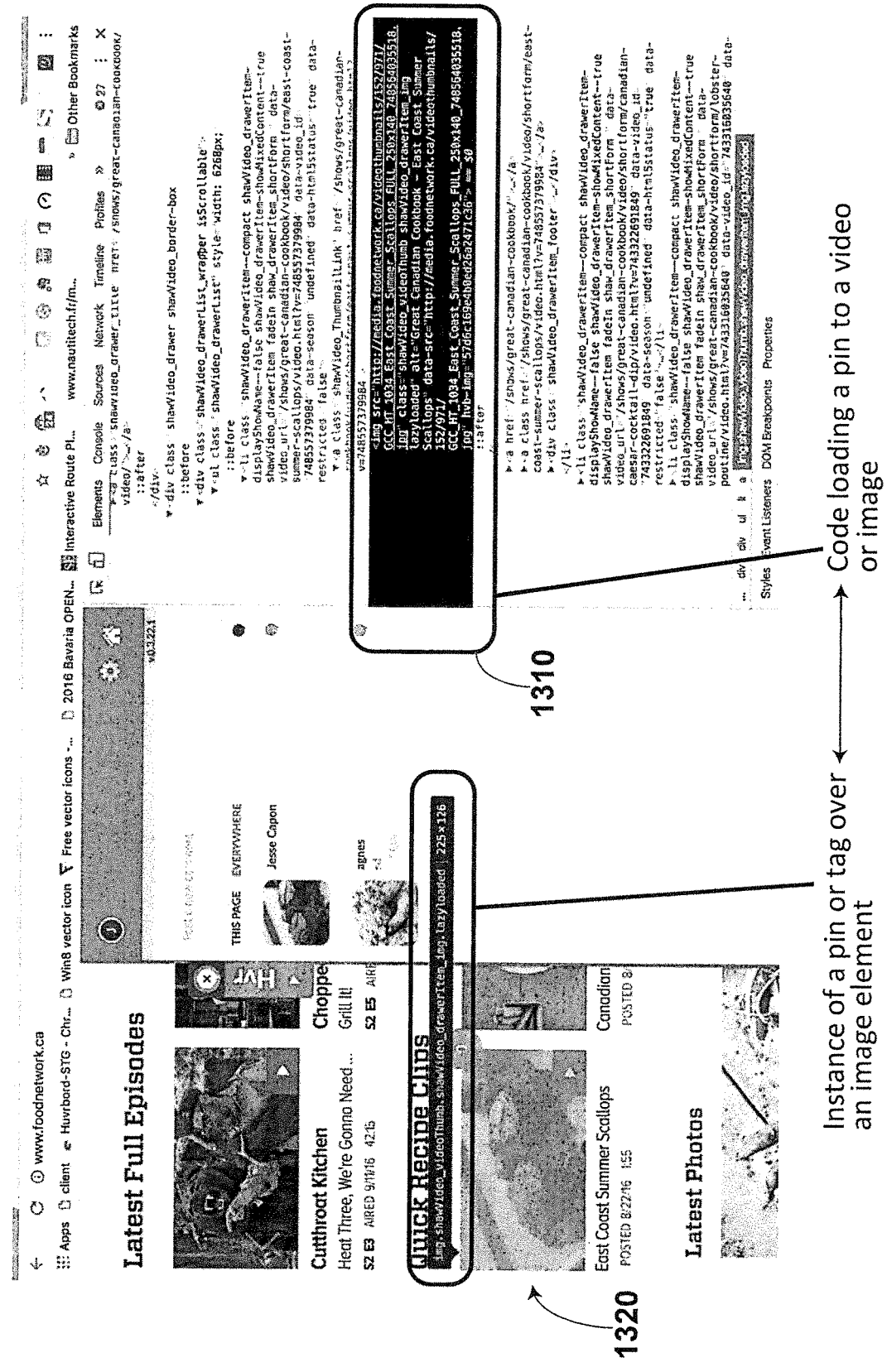

FIG. 13 shows an instance of a visual anchor point 1320 over a content element. In this embodiment, the visual anchor point 1320 is shown as a semi-transparent layer on top of the image content element. Corresponding platform code 1310 effects loading the visual anchor point 1320 to the image content element.

Figure 14:

FIG. 14 shows comment display boxes 680a, 680b, each associated with a content element 630. Platform code 1410 may be in HTML script and injected into browser HTML to present a visual anchor point 630 over an URL.

Figure 15:
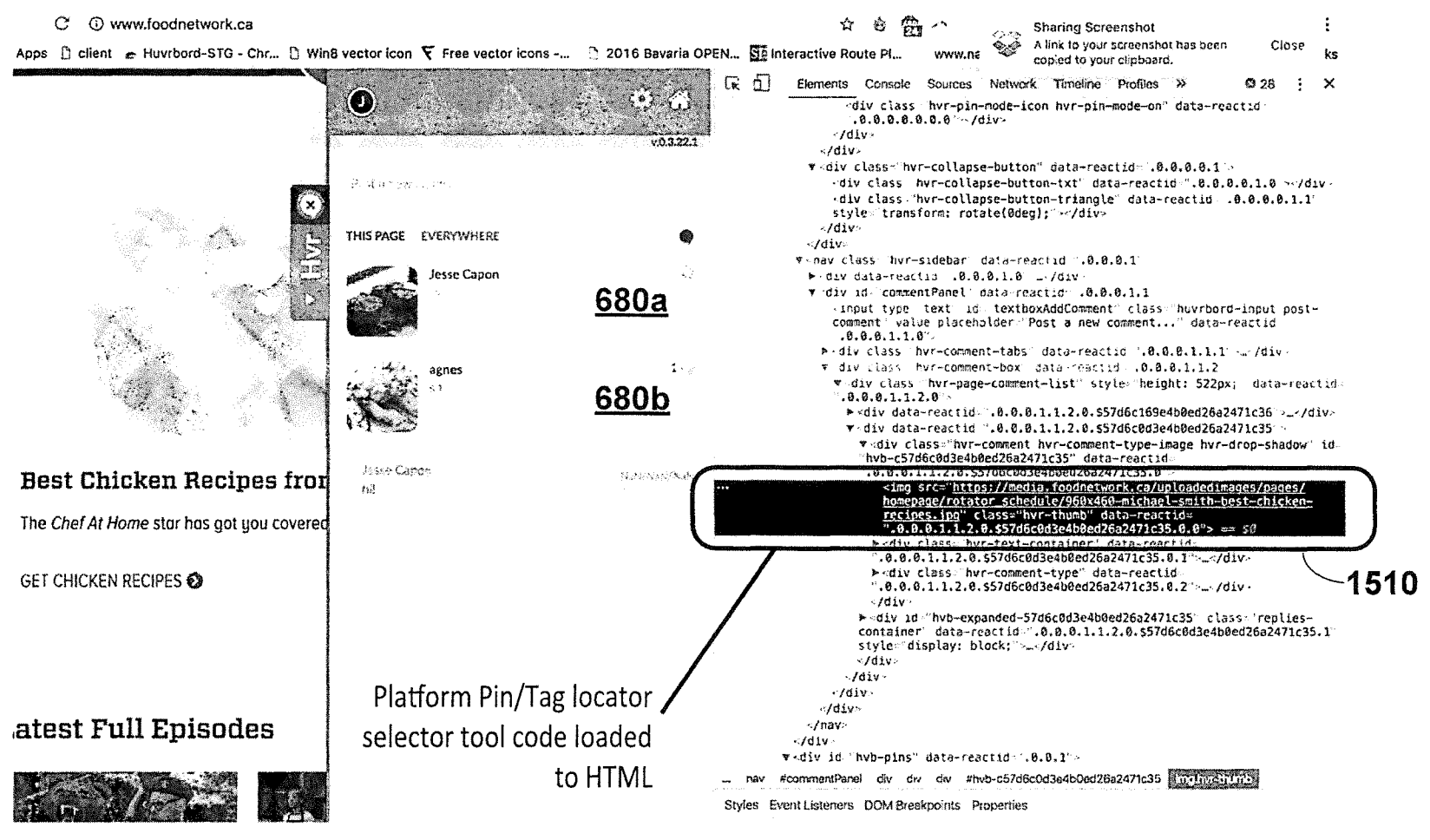

FIG. 15 shows comment display boxes 680a, 680b, each associated with a content element. Platform code 1510 may be in HTML script and injected into browser HTML to present a locator/selector tool, which can be used by a user to tag a content element with a comment.

Figure 16A:
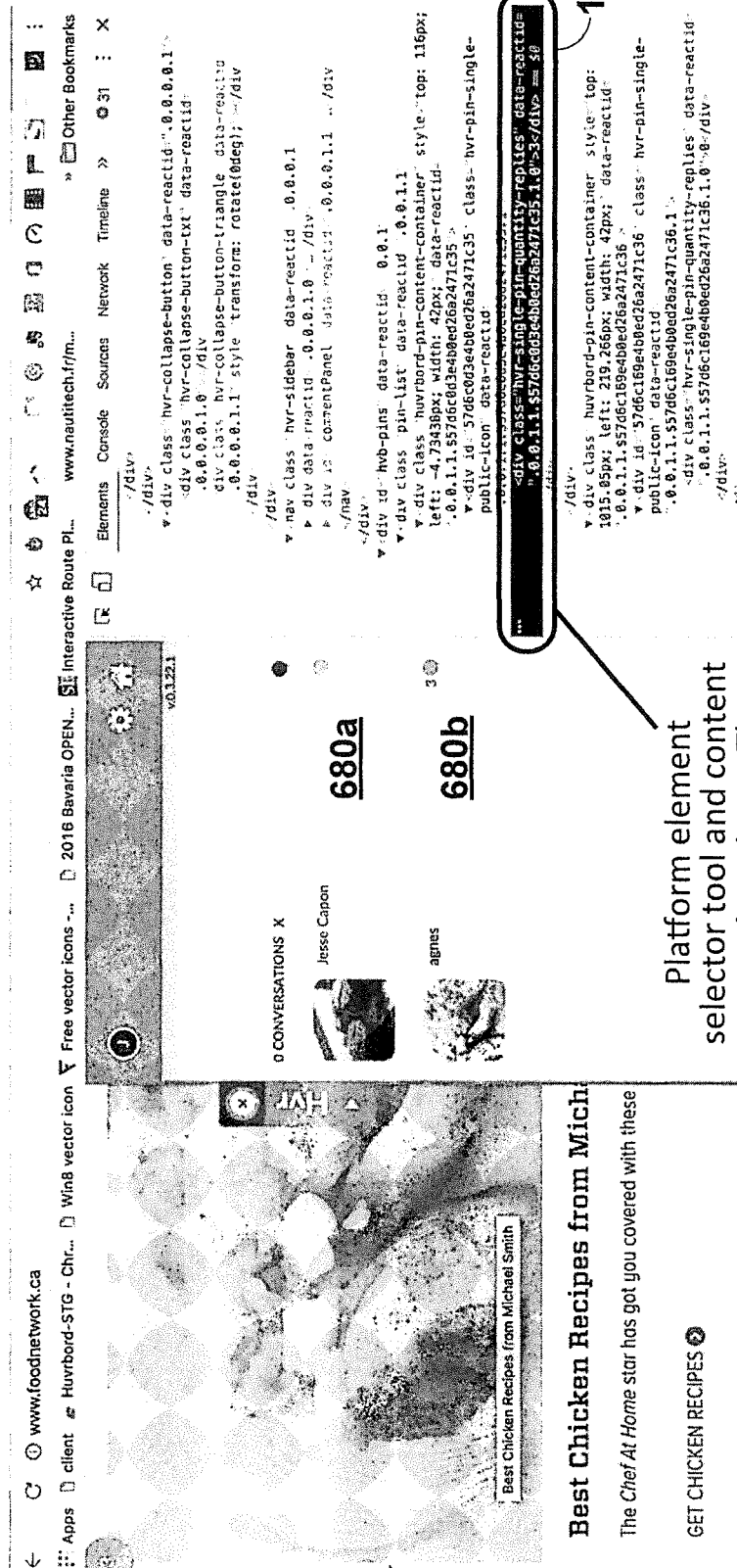
Figure 16B:
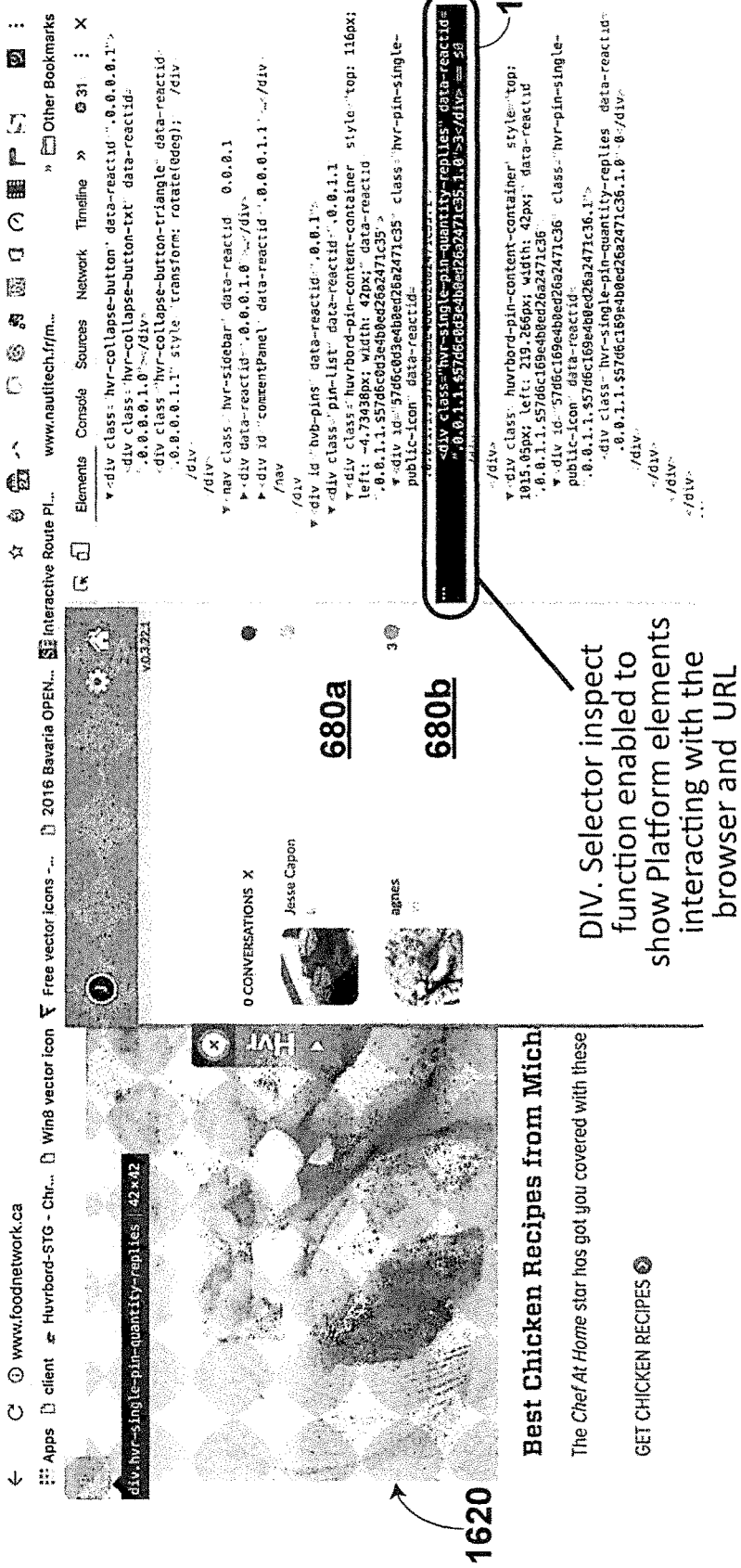

FIG. 16A shows comment display boxes 680a, 680b, each associated with a content element 1620. Platform code 1610 may be in HTML script and injected into browser HTML to present a selector tool and content mapping trigger. Similarly, FIG. 16B shows platform code 1630 used to present a selector inspect function enabled to show platform elements interacting with the browser and URL.

Figure 17:
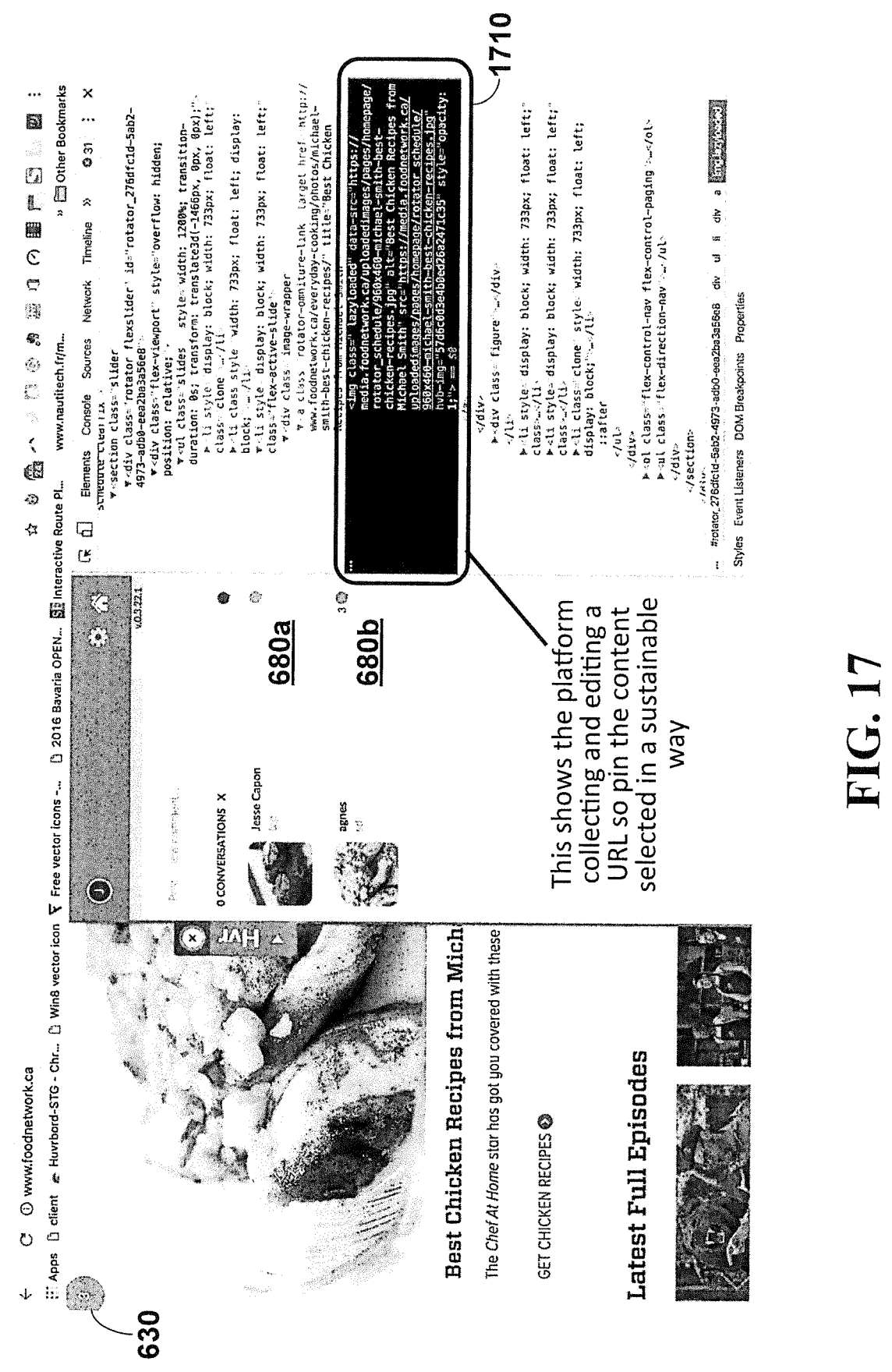

FIG. 17 shows comment display boxes 680a, 680b, each associated with a content element. Platform code 1710 may be injected into browser HTML to collect and edit a URL so the visual anchor point 630 is placed over content element in a stable and sustainable manner.

Figure 18:
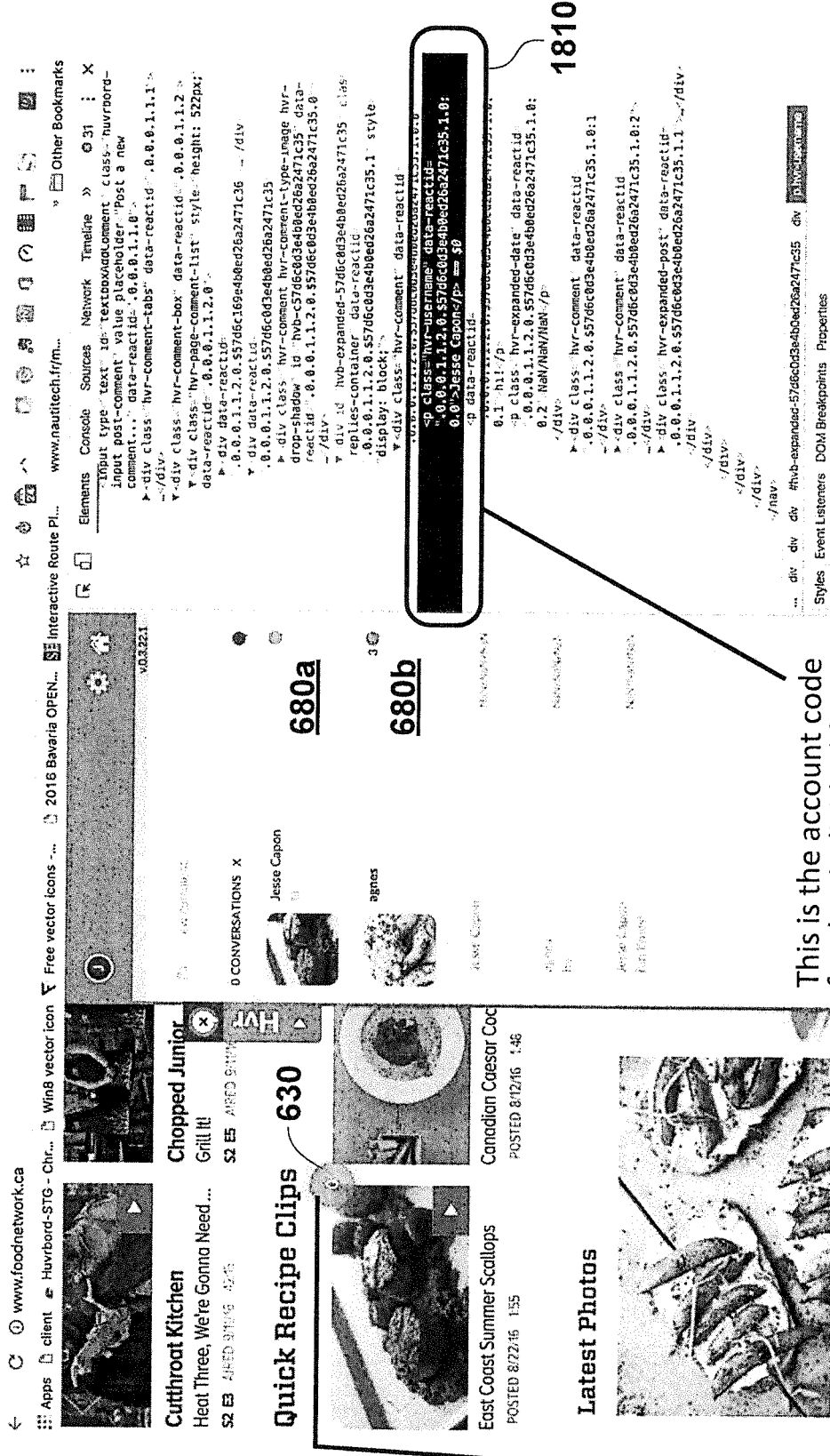

FIG. 18 shows platform code 1810 used to locate an individual user account in real time over a tagged content element.

Figure 19:
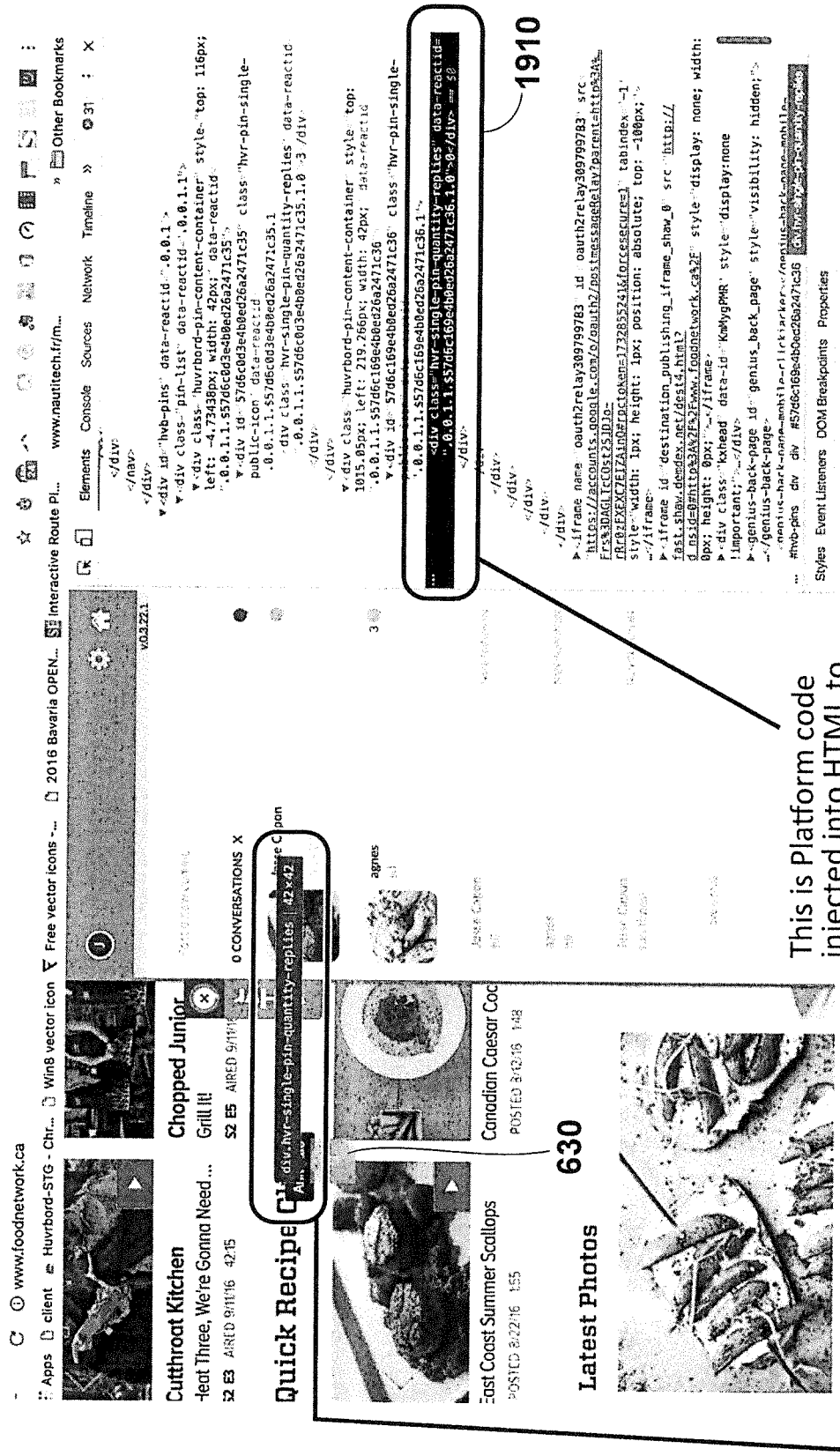

FIG. 19 shows platform code 1910 used to provide a total count of comments associated with visual anchor point 630 placed over a content element.

Figure 20A:
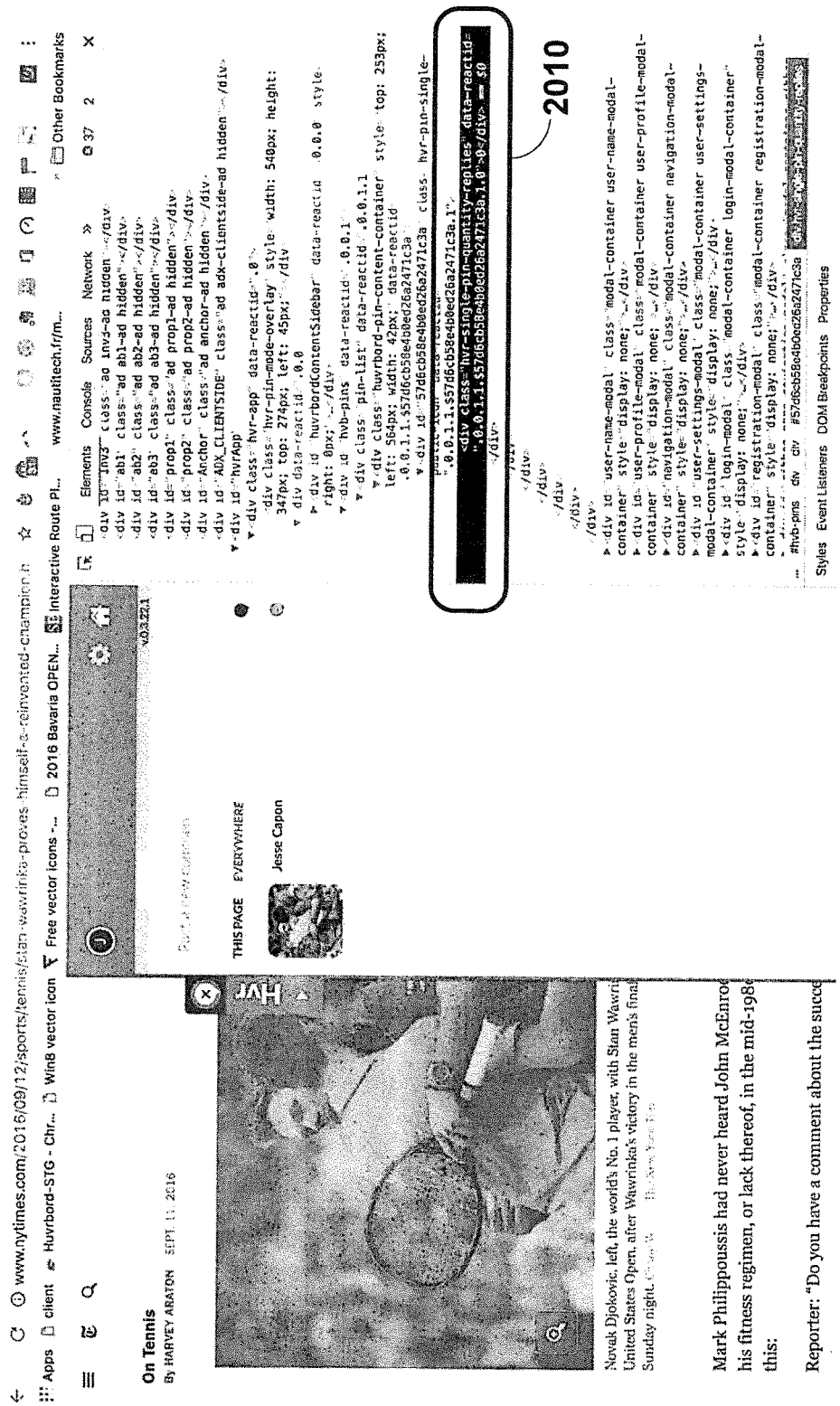
Figure 20B:
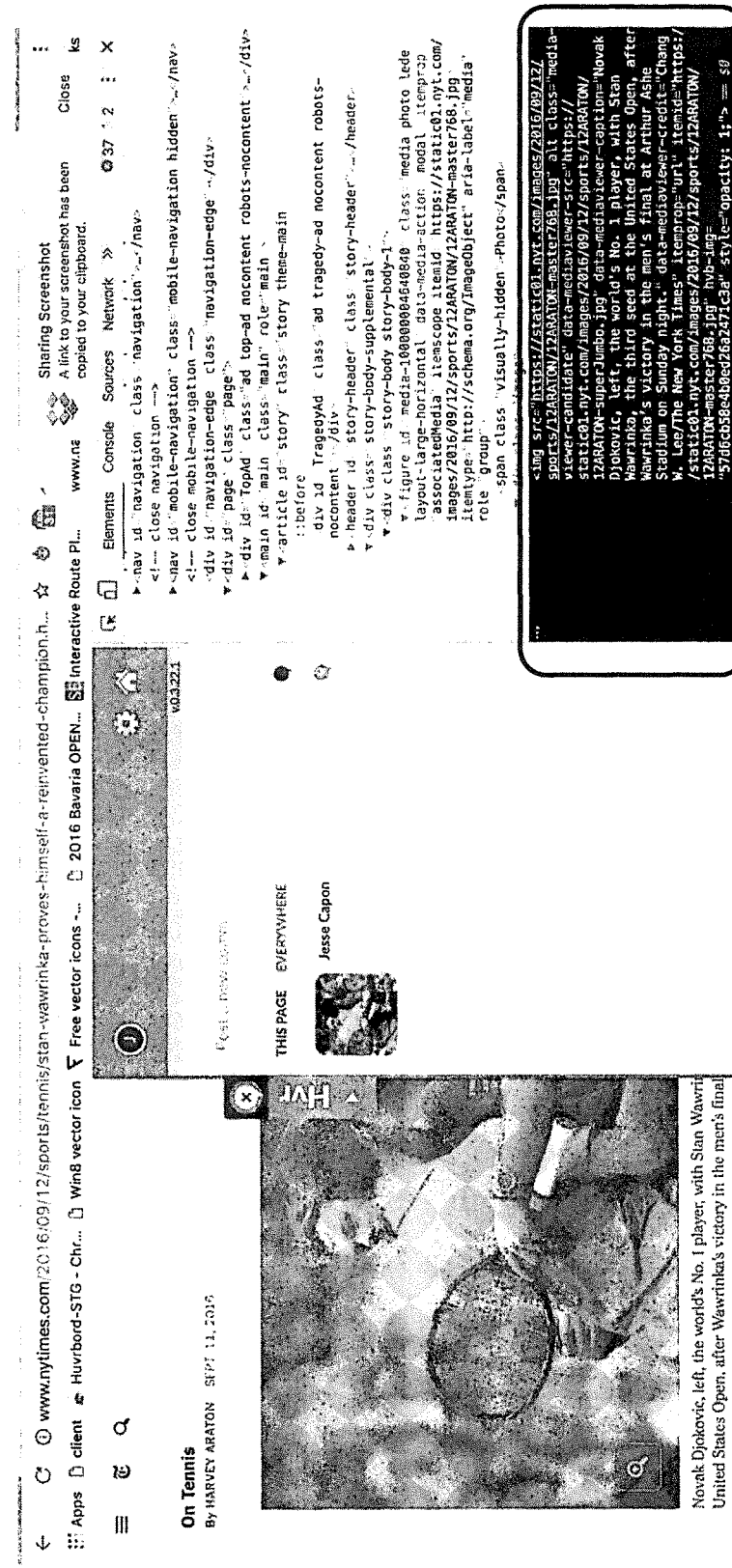

FIGS. 20A and 20B are screenshots showing platform 100 finding a content element and then rebuilding a stable tag location (e.g. non-dynamic URL) that can generate a static underlying URL location for this content online.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Figure 22:
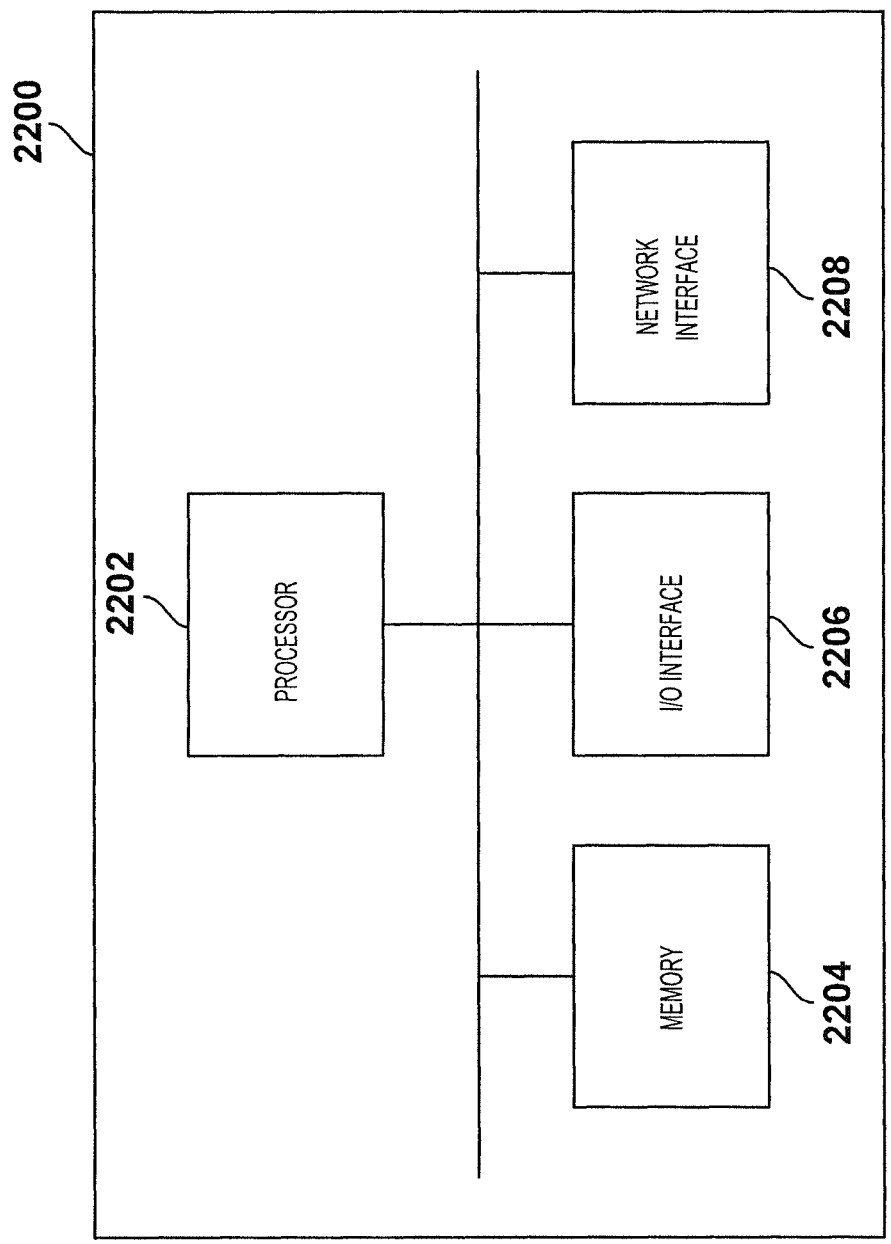
FIG. 22 is an example schematic diagram of computing device, according to some embodiments.

FIG. 22 is a schematic diagram of computing device 2200, exemplary of an embodiment. As depicted, computing device includes at least one processor 2202, memory 2204, at least one I/O interface 2206, and at least one network interface 2208.

Processor 2202 may be an Intel or AMD x86 or x64, PowerPC, ARM processor, or the like. Memory 2204 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 2206 enables computing device 2200 to interconnect with one or more input devices, such as a keyboard, mouse, camera, touch screen and a microphone, or with one or more output devices such as a display screen and a speaker.

Each network interface 2208 enables computing device 2200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WMAX), SS27 signaling network, fixed line, local area network, wide area network, and others, including any combination of these.

Figure 23:
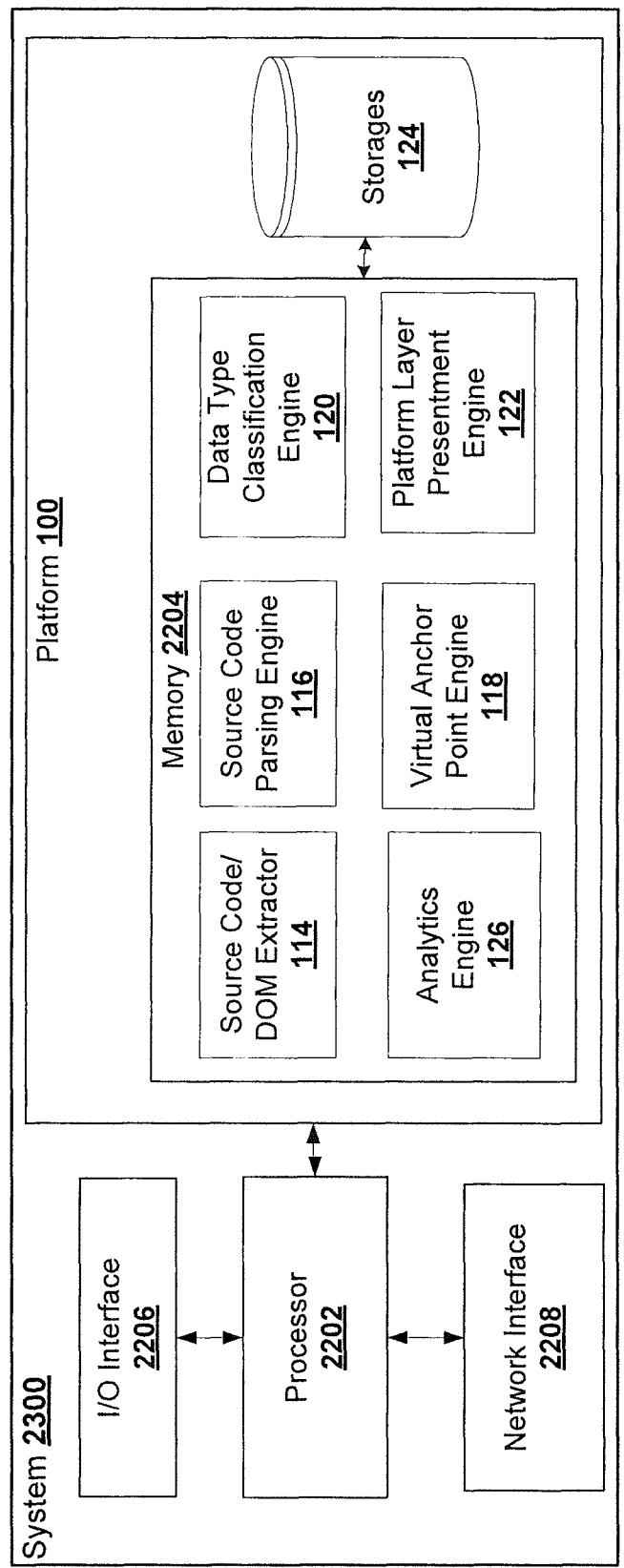
FIG. 23 is an example block schematic diagram of a system including an example platform implemented using a computing device, according to some embodiments.

FIG. 23 is an example embodiment of system 2300 comprising example platform 100. System 2300 may include I/O interface 2206, processor 2202, network interface 2208, and platform 100. Components of platform 100 may reside on memory device 2204 and communicates with storages 124 to retrieve or store data. Components of platform 100 may include, for example, Source Code/ DOM Extractor 114, Source Code Parsing Engine 116, Data Type Classification Engine 120, Analytics Engine 126, Virtual Anchor Point engine 118, and Platform Layer Presentment Engine 122.

Figure 24:
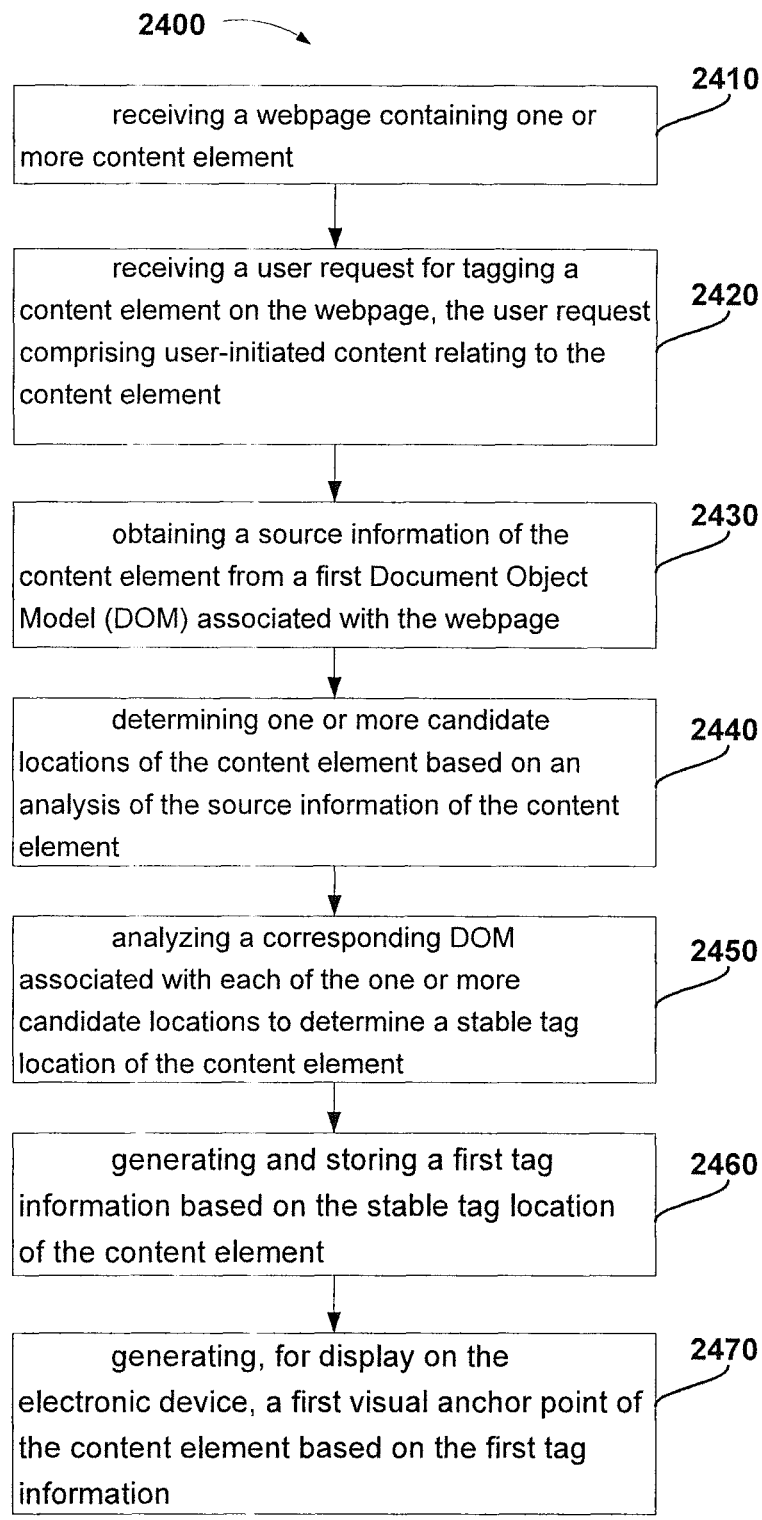
FIG. 24 is an example process of a platform performed by a computer processor, according to some embodiments.

FIG. 24 is a flow chart diagram illustrative of an example method 2400 performed by platform 100 according to some embodiments. The method may include more, less, different, or alternate steps, and steps may be performed in different orders, combinations, and permutations.

The digital communications or content platform is implemented on processors configured for providing content layer persistence and data capture engines, the processors configured for intercepting web content and conducting processing on the web content to update or otherwise maintain data structures housing data records representative of visual content elements. The visual content elements are dynamically generated and rendered such that the visual content elements are visually proximate content and maintain connections that adaptively reflect changes to dynamic features of webpages, as identified by the content layer persistence and data capture engines. Periodic crawler and update mechanisms are applied, in some embodiments, to identify changes to dynamic features of webpages, and to trigger required updates and modifications thereof to the data structures to reflect the changes.

At step 2410, the platform receives the webpage including the content elements. Webpages can be provided in the form of various types of markup language, source code, server side scripting, client side scripting, and webpages are often linked to one another by way of hyperlinks or other references. Webpages are associated with specific IP addresses, domain names, and these IP addresses (e.g., subnetworks by way of network prefixes) and domain names may be indicative of associations between related webpages. An interception tool (e.g., inspector engine) may be utilized to capture the source code as provided by the webpage. The interception tool may be configured for receiving network traffic between a user computing device requesting the content and a data source (e.g., the Internet), or may be software client residing on the user device (e.g., a browser extension).

A user is able to submit a request for tagging a content element at step 2420. The platform, in some embodiments, is configured to generate control signals that control a browser to highlight or otherwise visually indicate (e.g., provide a transparency effect) that and the content element on the webpage is available for tagging. In some cases, the content elements are highlighted responsive to mouse hoverover.

Source information of the content element is extracted at step 2430 through traversal of a document object model (DOM) of the webpage, which is generated such that a number of connected nodes having content elements are linked to one another to represent the entirety of the webpage. At step 2440, candidate locations are identified from the DOM, and the location of the content is tracked to identify whether the content is part of a dynamic or a static portion of the webpage source code, and also whether the content is provided in the form of original hosted content or hyperlinked content (e.g., hosted on another, potentially unrelated website). There can be multiple candidate locations, and in some embodiments, the candidate locations can be ranked for insertion into a data structure at step 2450, assessing which of the candidate locations is best suited as a stable tag location for the content element. In some embodiments, at step 2460, a reduced data set is stored on the data structure including the additional information in the user's tag information (e.g., user generated or initiated content), as well as the candidate locations and/or information derived from DOM nodes within a range of proximity around the candidate locations. Where there is a shift in the website, the alternate candidate locations can be quickly assessed to determine a new candidate location for storing the tag. A presentation layer is provided at step 2470 that generates control signals that encapsulate visualization elements and tag content to be rendered on top of a view of the underlying content, such that a persistent overlay is rendered showing a hybrid webpage view of the underlying content along with the dynamic tags from the user or from one or more other users. Where the presentation layer is in communication with a client on a computing device, the presentation layer of a backend engine generates a visualization container that, in some embodiments, is a derived subset of information stored on the data structure that includes a streamlined set of commands and controls to the display device. In some embodiments, the container is a transformed data set based on the underlying data structure, indicative of the visual coordinate information and content for the visual components, but also the selected candidate location within the DOM and 1-2 other candidate locations that serve as backup potential locations for rendering the visual components. The output container can be utilized, for example, to control one or more browsers or renderings graphically provided on user devices, and displays thereof, and the client residing on the one or more browsers consumes the output container to render the updated hybrid website output.

Figure 25:
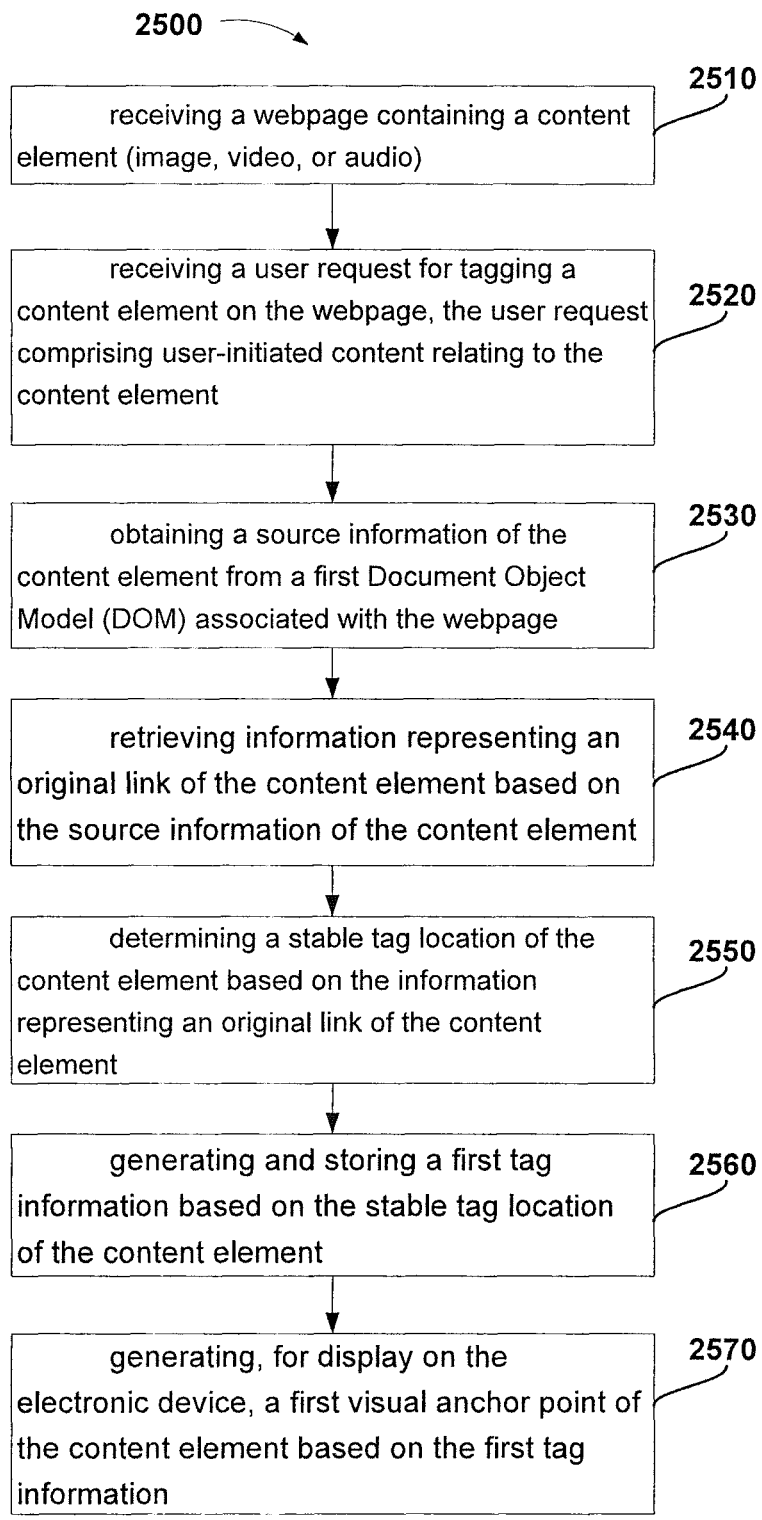
FIG. 25 is another example process of a platform performed by a computer processor, according to some embodiments.

An method 2500 for tagging a content element is provided in FIG. 25 performed by platform 100 in accordance with some embodiments, showing method steps 2510-2570. In FIG. 25, the content information may include an image, a video, an audio, or any combination thereof, and in FIG. 25, at steps 2540 and 2550, the stable tag location is generated by transforming URLs to establish an original link of the content element based on the source information of the content element (e.g., by parsing out or removing portions of URLs identified through a parsing of the DOM).

In some embodiments, platform 100 may execute programmable instructions to perform a method for providing a presentation layer configured to persist over a webpage and present a set of visual components based on content of the webpage, the presentation layer operable to be displayed on top of the webpage on a display screen of an electronic device. The method may include the steps of: receiving, by a computer processor, a webpage comprising a content element, the content element comprising one of: an image, a video and an audio; receiving, by the computer processor, one or more electronic signals from the electronic device representing a user request for tagging the content element on the webpage, the user request comprising user-initiated content relating to the content element; obtaining, by the computer processor, a source information of the content element from a Document Object Model (DOM) associated with the webpage; retrieving, by the computer processor, information representing an original link of the content element based on the source information of the content element; determining, by the computer processor, a stable tag location of the content element based on the information representing an original link of the content element; generating and storing a tag information based on the stable tag location of the content element; and generating, for display on the electronic device, a visual anchor point of the content element based on the tag information, wherein the visual anchor point is configured to be presented as an overlay on top of the content element on the webpage when displayed.

In some embodiments, the method may further include generating, for display on the electronic device, the user-initiated content relating to the content element, wherein the user-initiated content may be configured to be presented as an overlay on top of the webpage when displayed.

In some embodiments, the information representing an original link of the content element may be determined based on a comparison of the content element to similar content in one or more databases.

In some embodiments, the content element may be a video or audio and the visual anchor point may be presented on the webpage at a point in time of the video or audio.

Platform 100 may be very efficient compared to other social media platforms existing today. It is a platform that can lock on to existing website data and add a text element to a thread as instructed by a user. Text is extremely "light" to store, as are links. There may be, in some embodiments, a number of benefits of the platform over state of the art, as elaborated below.

Reference speeds: the way the platform organizes and layers threads of communication and content is like a lateral move across all domains and sites. User feedback is that they are concerned less with the site and more with specific topics tailored to the user's interests. Other users report the ability to make choices much faster and accurately as they do not need to open more channels or links.

Research returns and response times: a user of the platform tends to open less "tabs" or browser windows in favor of organizing the websites via the platform. This greatly improves system speed and browser usability as opening multiple tabs and browsers can have a negative effect on system speeds and browser usability.

Adaptability of the platform to other designs: the platforms GUI may be designed to be reactive to its environment. The elements are able to move around and load in a way which is intuitive to a user. The effect is that a user has a personalized internet.

No integration necessary to use: reports from sites, brands and media indicate that having the communication and user interaction take place right in browser frame along with the web content is a value proposition they are eager to engage. Large websites are seeing their content and monetization opportunity being taken away by social media and offline products. Platform in the present disclosure may give the website owners the opportunity to stay in frame and on message, and also the opportunity to communicate their brand value to the users.

Sort and filter functionality: platform may be configured to provide a number of content filter and sorting techniques via user groups, pattern comparison, analytic comparison, and so on.

Private, public and invite only communication in one platform: platform 100 may provide a set of switches which neatly organize the opportunity to publish comments and tags privately or publicly, or in a private or public group. The result is a platform that organizes all levels and all kinds of communication in one place.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

As can be understood, the examples described above and illustrated are intended to be exemplary only.

What is claimed is:

1. A computer-network-implemented method for providing a graphical user interface configured to persist over a webpage and to present a set of visual components based on content of the webpage, the graphical user interface operable to be displayed as a graphical overlay rendered over the webpage on a display screen of an electronic device such that a hybrid webpage is displayed, the method comprising:

receiving, by a computer processor, computer instruction code representing a webpage comprising one or more content elements, the computer instruction code, when executed, causes the computer processor to render the webpage and the one or more content elements;

receiving, by the computer processor, one or more electronic signals from the electronic device representing a user request for tagging a selected content element of the one or more content elements on the webpage, the user request comprising user content relating to the content element;

obtaining, by the computer processor, a source information of the content element from a Document Object Model (DOM) associated with the webpage;

determining, by the computer processor, one or more candidate locations of the content element within the computer instruction code based at least on an analysis of the source information of the selected content element;

analyzing, by the computer processor, one or more nodes of the DOM proximate or associated with each of the one or more candidate locations within a DOM hierarchy of the one or more nodes of the DOM to determine a stable tag location of the selected content element from the one or more candidate locations, the stable tag location representing a location within the computer instruction code of the webpage where additional computer instruction code can be appended such that a visual tag is graphically anchored on or visually proximate to the selected content element when the webpage is rendered;

generating and storing a first tag information based at least on the stable tag location of the selected content element; and generating first control signals adapted to control of the display screen on the electronic device, the first control signals, when executed, causing rendering of a first visual anchor point of the selected content element based on the first tag information overlaid on top of the selected content element on the webpage when displayed;

wherein the source information of the selected content element comprises a Uniform Resource Locator (URL) and the stable tag location comprises a stable portion of the URL, wherein the stable portion of the URL is obtained by parsing the URL to remove non-relevant portions of the URL.

2. The method of claim 1, comprising:

obtaining, by the computer processor, a corresponding type of each of the one or more content elements from the DOM associated with the webpage;

determining, by the computer processor, whether each of the one or more content elements is tag-able based on the corresponding type thereof;

generating and storing a list of DOM node location identifiers corresponding to all tag-able content elements in a non-transitory database.

3. The method of claim 2, comprising:

receiving, by the computer processor, one or more electronic signals from the electronic device representing a user input event relating to a tag-able content element of the one or more content elements;

in response to the user input event, generating, for display on the electronic device, a visual layer, overlaid on top of the tag-able content element on the webpage when displayed; and generating second control signals adapted to control of the display screen on the electronic device, the second control signals, when executed, causing rendering of the user-generated content relating to the selected content element overlaid on top of the webpage when displayed.

4. The method of claim 3, wherein the user input event comprises an event where a cursor hovers the tag-able content element.

5. The method of claim 1, wherein analyzing the DOM to determine the stable tag location of the selected content element from the one or more candidate locations includes:
for each candidate location of the one or more candidate locations, identifying a DOM node associated with the candidate location;
traversing the DOM hierarchy to analyze proximate nodes within a pre-defined depth of analysis centered based on the DOM node associated with the candidate location;
retrieving one or more objects from the proximate nodes; and
heuristically analyzing the retrieved one or more objects from the DOM to identify the stable tag location of the one or more candidate locations.

6. The method of claim 5, wherein the tag information comprises the stable tag location and the one or more objects proximate in the DOM hierarchy.

7. The method of claim 1, comprising:
generating and storing a second tag information based on the one or more candidate locations of the selected content element; and
generating, for display on the electronic device, a second visual anchor point of the selected content element based on the second tag information, wherein the second visual anchor point is rendered over the selected content element when the selected content element is displayed.

8. The method of claim 7, wherein the placement of the second visual anchor point is based at least in part on the user request.

9. The method of claim 1, further comprising generating and presenting a graphical user interface (GUI) component as an overlay rendered over of the webpage, the GUI component comprising a plurality of user content, wherein one or more of the plurality of user-initiated content is related to the visual anchor point.

10. A system for providing a graphical user interface configured to persist over a webpage and present a set of visual components based on content of the webpage, the graphical user interface operable to be displayed on top of the webpage on a display screen of an electronic device, the system comprising:
an I/O interface;
a non-transitory memory device; and
a computer processor, when executing programmable instructions stored on the non-transitory memory device, is configured to perform the following:
receive, via the I/O interface, a computer instruction code representing a webpage comprising one or more content elements, the computer instruction code, when executed, causes the computer processor to render the webpage and the one or more content elements;
receive, via the I/O interface, one or more electronic signals from the electronic device representing a user request for tagging a selected content element of the one or more content elements on the webpage, the user request comprising user-content relating to the content element;
obtain a source information of the content element from a Document Object Model (DOM) associated with the webpage;
determine one or more candidate locations of the content element within the computer instruction code based at least on an analysis of the source information of the selected content element;
analyze one or more nodes of the DOM proximate or associated with each of the one or more candidate locations within a DOM hierarchy of the one or more nodes of the DOM to determine a stable tag location of the selected content element from the one or more candidate locations, the stable tag location representing a location within the computer instruction code of the webpage where additional computer instruction code can be appended such that a visual tag is graphically anchored on or visually proximate to the content element when the webpage is rendered;
generate and store a first tag information based at least on the stable tag location of the selected content element; and
generate, for display on the electronic device, a first visual anchor point of the content element based on the first tag information, wherein the first visual anchor point overlaid on top of the content element on the webpage when displayed;
wherein the source information of the selected content element comprises a Uniform Resource Locator (URL) and the stable tag location comprises a stable portion of the URL, wherein the stable portion of the URL is obtained by parsing the URL to remove non-relevant portions of the URL.

11. The system of claim 10, wherein the computer processor is further configured to:
obtain a corresponding type of each of the one or more content elements from the DOM associated with the webpage;
determine whether each of the one or more content elements is tag-able based on the corresponding type thereof;
generate and store a list of DOM node location identifiers corresponding to all tag-able content elements in the non-transitory memory device.

12. The system of claim 11, wherein the computer processor is further configured to:
receive one or more electronic signals from the electronic device representing a user input event relating to a tag-able content element of the one or more content elements;
in response to the user input event, generate, for display on the electronic device, a visual layer, wherein the visual layer is overlaid on top of the tag-able content element on the webpage when displayed; and
generate, for display on the electronic device, the user-initiated content relating to the content element, wherein the user-initiated content overlaid on top of the webpage when displayed.

13. The system of claim 12, wherein the user input event comprises an event where a cursor hovers the tag-able content element.

14. The system of claim 10, wherein analyzing the DOM to determine the stable tag location of the selected content element from the one or more candidate locations includes:
for each candidate location of the one or more candidate locations, identifying a DOM node associated with the candidate location;
traversing the DOM hierarchy to analyze proximate nodes within a pre-defined depth of analysis centered based on the DOM node associated with the candidate location;

retrieving one or more objects from the proximate nodes; and heuristically analyzing the retrieved one or more objects from the DOM to identify the stable tag location of the one or more candidate locations.

15. The system of claim 14, wherein the tag information comprises the stable tag location and the one or more objects proximate in the DOM hierarchy.

16. The system of claim 1, wherein the computer processor is further configured to:

generate and store a second tag information based on the one or more candidate locations of the selected content element; and generate, for display on the electronic device, a second visual anchor point of the selected content element based on the second tag information, wherein the second visual anchor point is rendered over the content element when displayed.

17. The system of claim 16, wherein the placement of the second visual anchor point is based at least in part on the user request.

18. The system of claim 10, wherein the the GUI component includes a plurality of user content, wherein one or more of the plurality of user-initiated content is related to the visual anchor point.

19. A special purpose computing apparatus for providing a graphical user interface configured to persist in relation to one or more webpages, the special purpose computing apparatus including one or more graphics processors and computer-readable memory, the special purpose computing apparatus configured for interoperation with one or more networked computing devices configured to render one or more webpages and to modify the rendering of the one or more webpages to overlay the graphical user interface, the special purpose computing apparatus comprising:

a processor coupled with computer memory, the processor configured to:

maintain a data structure including data records representative of characteristics of a set of visual components adapted for rendering on a graphical user interface persisting in proximity to or over top of the one or more webpages, wherein each visual component of the set of visual components includes a locator field representative of a corresponding anchor position defining a relative location on a corresponding webpage that the visual component is rendered when the corresponding webpage is rendered by the one or more networked computing devices;

intercept source code for the rendering of the one or more webpages, the webpage source code parsing engine configured to parse the intercepted source code to identify one or more candidate anchor locations within the one or more webpages where the visual components of the set of visual components can be anchored, each of the one or more candidate anchor locations being associated with a content object rendered on the one or more webpages;

receive selected inputs from one or more users operating the one or more networked computing devices indicative of a new tag to be associated with a selected candidate anchor location of the one or more candidate anchor locations;

responsive to each selected input of the selected inputs from the one or more users, generate, in association with the new tag, a new visual component to be appended to the data structure and to be maintained by the graphical user interface persistence engine at the selected candidate anchor location, the visual component generator configured to parse the source code to determine whether the content object underlying the selected anchor location is hosted directly on the webpage, or hyperlinked to a web location hosted on an underlying content server;

update the data structure to include, for the new tag, data records for a new visual component indicative of a relative position on the visual component, and upon a determination that the content object underlying the selected anchor location is hyperlinked to the web location hosted on the underlying content server, generating an additional linkage linking the new visual component to the web location hosted on the underlying content server; and append new source code into the intercepted source code for a webpage being traversed by a user of the one or more users on a corresponding networked computing device, the new source code representative of visual components associated with content objects in the webpage being traversed; the new source code causing the networked computing devices, when rendering the one or more webpages, to display the visual components associated with content objects in the webpage being traversed at the corresponding anchor positions within the rendered webpage in a hybrid webpage.

20. The special purpose computing apparatus of claim 19, wherein the processor is further configured to systematically traverse the one or more webpages to identify changes in a layout or a hierarchy of the one or more webpages, and responsive to the identified changes, update the data structure to adapt the to the identified changes by modifying coordinate positions of the one or more anchor locations corresponding to each visual component maintained in the data structure.

21. The special purpose computing apparatus of claim 20, wherein the processor is further configured to identify archiving changes in the webpages by periodically determining through a periodic crawl that a content element no longer exists on a particular webpage by comparing against a stored version of the webpage in data storage, and an alternate candidate anchor location from the one or more candidate anchor locations is identified as a new selected candidate anchor location.

22. The special purpose computing apparatus of claim 19, wherein the processor is further configured to generate a stabilized version of the intercepted source code by separating static markup language sections of the webpage source code from dynamic sections of the webpage source code, transforming the dynamic sections of the webpage source code into static markup language by recording a point-in-time source code snapshot of the dynamic sections of the webpage source code;

wherein the one or more candidate anchor locations are identified by the visual component generator based on the stabilized version of the intercepted source code.

23. The special purpose computing apparatus of claim 19, wherein the special computing apparatus is a standalone computing appliance that is configured for networked interconnections for rendering one or more webpages.

24. The special purpose computing apparatus of claim 23, wherein the standalone computing appliance is a rack-mounted device adapted for use in relation to an organization, wherein the one or more one or more networked computing devices are all organization-issued devices and the processor is configured to propagate user content by way of the visual components rendered on browsers rendering web content associated with each of one or more one or more networked computing devices, the visual components facilitating virtual collaboration among the users of the organization.

* * * * *